United States Patent
Yamane et al.

(10) Patent No.: US 6,605,770 B2
(45) Date of Patent: Aug. 12, 2003

(54) PLAY LIST GENERATION DEVICE, AUDIO INFORMATION PROVISION DEVICE, AUDIO INFORMATION PROVISION SYSTEM, METHOD, PROGRAM AND RECORDING MEDIUM

(75) Inventors: Hiroaki Yamane, Osaka (JP); Junichi Tagawa, Osaka (JP); Masayuki Misaki, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/102,033

(22) Filed: Mar. 20, 2002

(65) Prior Publication Data

US 2002/0134220 A1 Sep. 26, 2002

(30) Foreign Application Priority Data

Mar. 21, 2001 (JP) .................................. 2001-079914

(51) Int. Cl.$^7$ ........................... G04B 13/00; G10H 7/00
(52) U.S. Cl. ................... 84/609; 84/615; 84/649; 84/653
(58) Field of Search ................... 84/600–602, 609–613, 84/615–618, 649–656

(56) References Cited

U.S. PATENT DOCUMENTS 6,243,725 B1 * 6/2001 Hempleman et al. ......... 84/601
6,248,946 B1 * 6/2001 Dwek ........................... 84/609
6,545,209 B1 * 4/2003 Flannery et al. .............. 84/609

FOREIGN PATENT DOCUMENTS

JP    2000-098950    4/2000

* cited by examiner

Primary Examiner—Marlon T. Fletcher
(74) Attorney, Agent, or Firm—Snell & Wilmer, LLP

(57) ABSTRACT

A play list generation device for generating a play list of a set of audio information streams in an order to be reproduced by are production device is provided. The play list generation device includes a condition input section for receiving a condition regarding a target; a transfer information stream acquisition section for acquiring a transfer information stream which represents a transfer of impressions given to the target based on the condition; and a play list generation section for selecting, from a first plurality of audio information streams stored in a database, a second plurality of audio information streams which give the target a transfer of impressions proximate to the transfer of impressions represented by the transfer information stream, and generating a play list including the selected second plurality of audio information streams as the set of audio information streams.

23 Claims, 19 Drawing Sheets

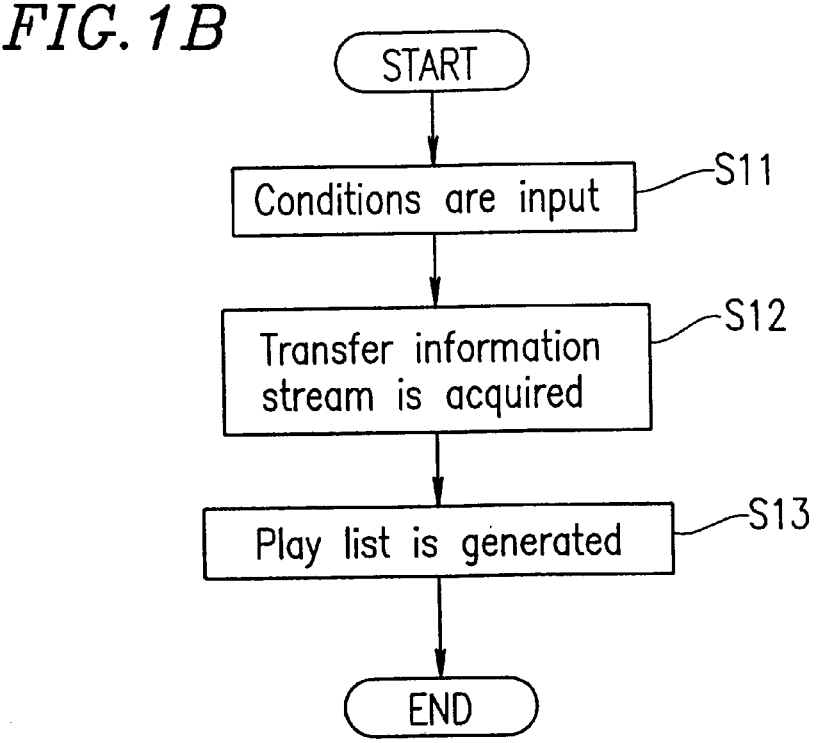

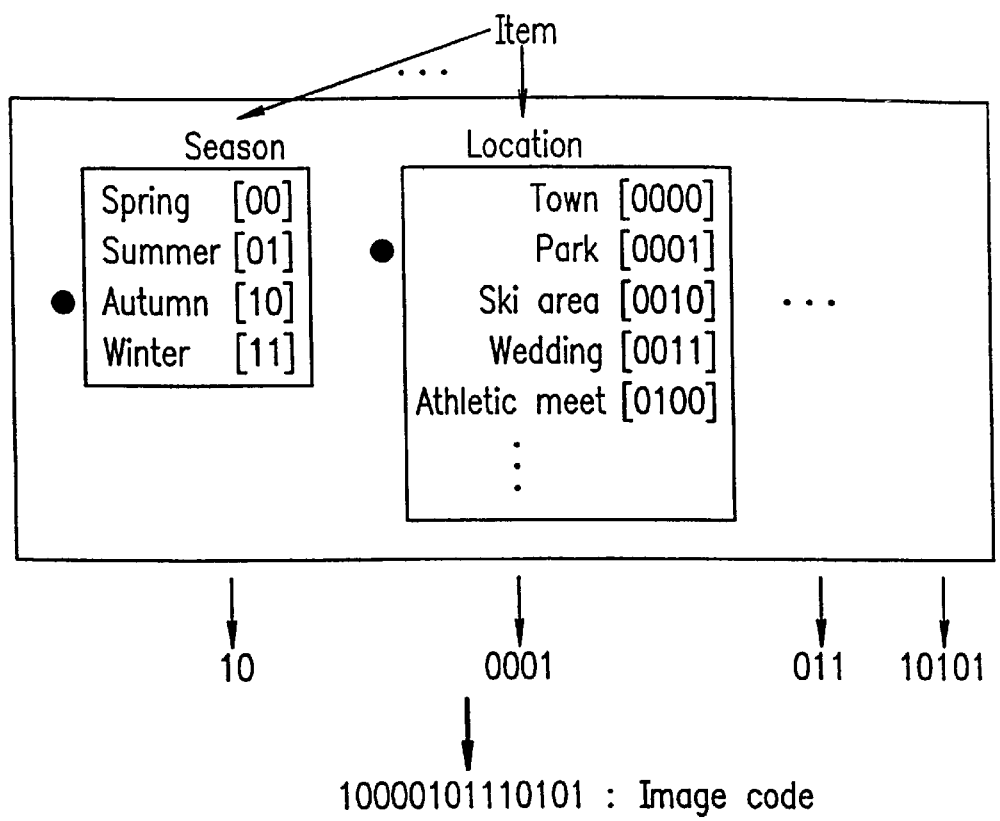

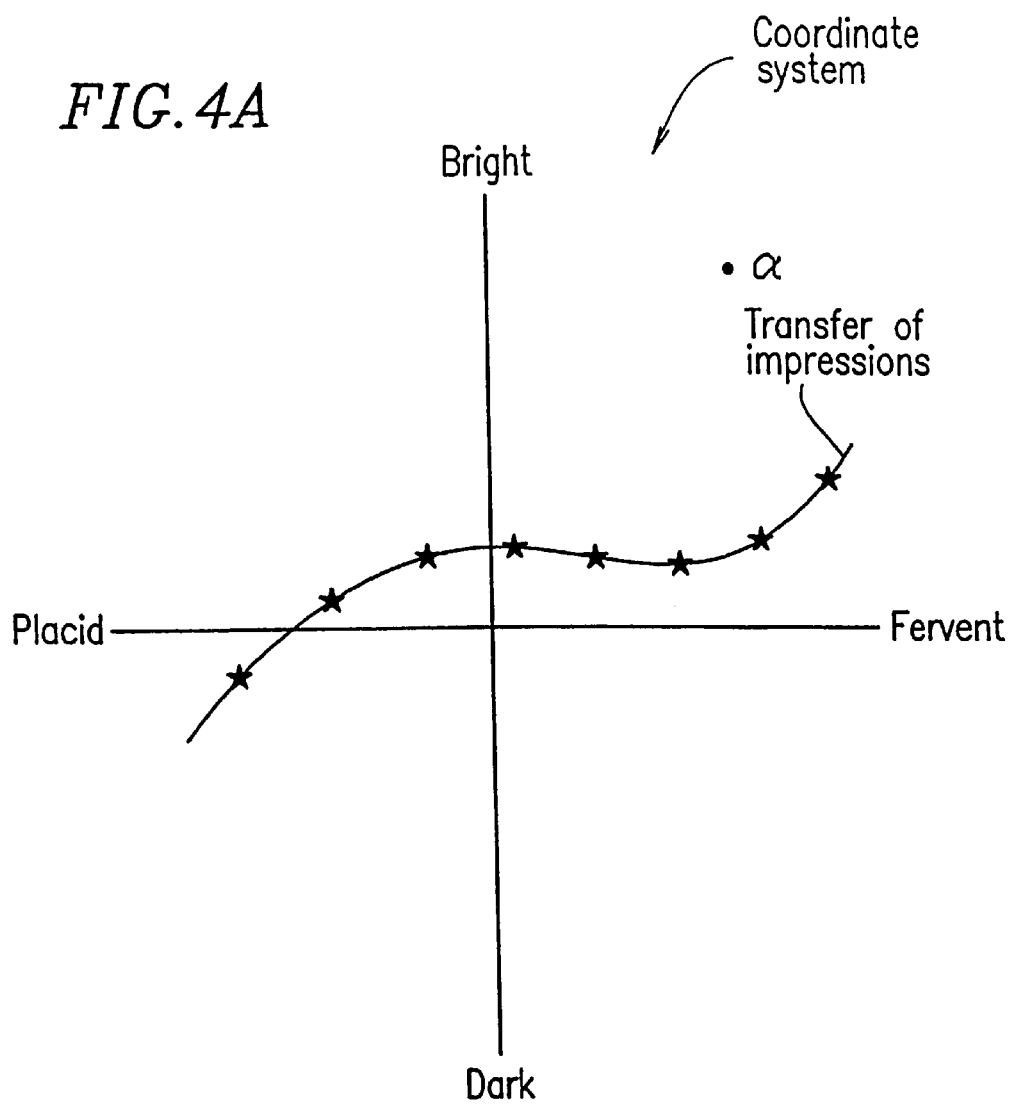

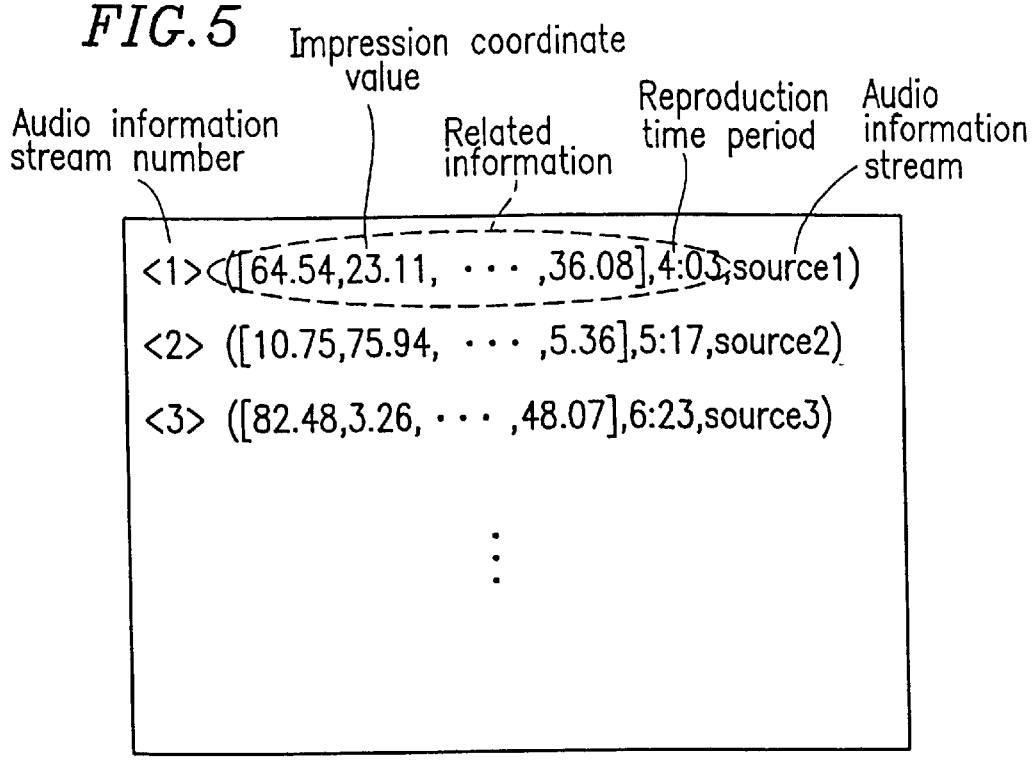

PLAY LIST GENERATION DEVICE, AUDIO INFORMATION PROVISION DEVICE, AUDIO INFORMATION PROVISION SYSTEM, METHOD, PROGRAM AND RECORDING MEDIUM

BACKGROUND OF THE INVENTION

1. Field of the Invention

The present invention relates to a play list generation device, an audio information provision apparatus, an audio information provision system, and an audio information provision method for providing audio information suitable to the image of the target to which the audio information is to be provided or the taste of the user; a program for causing a computer to generate a play list; and a recording medium having such a program recorded thereon.

2. Description of the Related Art

Conventionally, services including a play list generation service and a background music provision service have been available as a service for providing songs. These services are realized in the form in which specialists select audio information suitable to an individual user's demand from a song database based on their specialized music knowledge, and provides a list of songs in the order determined by the specialists for the songs to be reproduced.

Japanese Laid-Open Publication No. 2000-98950 proposes a system for automatically and continuously providing songs. This system functions as follows. Each menu of a restaurant is assigned audio signal type information in advance. Background music of a genre which is suitable to the ordered menu is automatically selected based on the audio signal type information and played in the restaurant.

Radio programs and cable broadcasting programs, for example, may be considered to be a kind of play lists since they continuously provide songs.

However, in order to realize these services, specialized music knowledge is required. In order to fulfill the various demands of users in a play list generation service, a wide range of knowledge of past audio information and understanding of human sensibility regarding music are necessary. Since an enormous amount of new songs are created and marketed day by day, songs included in the play list are different depending on when the play list is ordered even though the demand of the users is the same. Therefore, the play list needs to be newly created or revised. In the system proposed in Japanese Laid-Open Publication No. 2000-98950, radio programs and cable broadcasting programs require specialized music knowledge in order to categorize the audio information and select songs suitable to time slots.

The system proposed in Japanese Laid-Open Publication No. 2000-98950 automatically switches the music genre. Therefore, there is a high possibility that songs which are not demanded by the restaurant customers are played. In the case of the radio programs and cable broadcasting programs, the program providers determine the songs to play. Therefore, play lists may not always fully satisfy the user's demand. These services cannot reflect the user's taste. By contrast, a company providing a play list generation service can generate a play list incorporating the user's taste in addition to the conditions of the target to which the songs are to be provided. Therefore, a play list highly satisfying the user can be generated. In this case, however, the user needs to keep on using the same play list.

SUMMARY OF THE INVENTION

According to one aspect of the invention, a play list generation device for generating a play list of a first set of audio information streams in an order to be reproduced by a reproduction device is provided. The play list generation device includes a first database storing a first plurality of audio information streams; a condition input section for receiving a condition of a target to which the first set of audio information streams reproduced by the reproduction device are to be provided; a transfer information stream acquisition section for acquiring a transfer information stream which represents a transfer of impressions given to the target by reproduction of a second set of audio information streams in a prescribed order based on the condition; and a play list generation section for selecting, from the first plurality of audio information streams stored in the first database, a second plurality of audio information streams which give the target a transfer of impressions proximate to the transfer of impressions represented by the transfer information stream, and generating a play list including the selected second plurality of audio information streams as the first set of audio information streams.

In one embodiment of the invention, the condition input section includes an audio information stream number input section for receiving a number of audio information streams to be included in the play list. The play list generation section selects a number of audio information streams equal to the received number of audio information streams, based on a plurality of impressions representing at least a part of the transfer of impressions.

In one embodiment of the invention, the condition input section includes a time input section for receiving a reproduction time period of the play list. The play list generation section selects the second plurality of audio information streams so that a total reproduction time period of the play list is equal to or less than the received reproduction period, based on a plurality of impressions representing at least a part of the transfer of impressions.

In one embodiment of the invention, the condition input section includes an image input section for receiving an image of the play list. The transfer information stream acquisition section stores a plurality of transfer information streams, and selects a transfer information stream corresponding to the image.

In one embodiment of the invention, the first database stores a plurality of related information streams respectively corresponding to the first plurality of audio information streams stored in the first database. The plurality of related information streams each have a coordinate value representing a position of the corresponding audio information stream in a prescribed coordinate system defining impressions of audio information streams. The transfer information stream represents a plurality of coordinate values in the prescribed coordinate system. The play list generation section selects an audio information stream to be added to the play list, from at least one audio information stream corresponding to at least one related information stream having a coordinate value within a prescribed range from a reference coordinate value which is obtained based on the plurality of coordinate values, based on a distance between the coordinate value included in the at least one related information stream and the reference coordinate value.

In one embodiment of the invention, the condition input section includes a selection method input section for receiving a selection method of an audio information stream. The play list generation section includes an evaluation expression generation section for generating an evaluation expression based on the selection system, and selects an audio information stream to be added to the play list from the at least one audio information stream, further based on the generated evaluation expression.

In one embodiment of the invention, the condition input section includes a satisfaction degree input section for receiving satisfaction degree information which represents a satisfaction degree of the target presented by the selected audio information stream. The play list generation device further includes a second database which stores time information representing a time when an audio information stream is provided to the target and the satisfaction degree information. The play list generation section selects an audio information stream to be added to the play list from the at least one audio information stream, further based on at least one of the time information and the satisfaction degree information.

In one embodiment of the invention, the satisfaction degree information further represents the condition of the target and the time when the satisfaction degree is input.

In one embodiment of the invention, the play list generation device further includes an impression determination section for externally receiving an audio information stream and determining an impression of the received audio information stream based on a musical feature of the received audio information stream. The first database stores the received audio information stream as well as a reproduction time period of the received audio information stream and the determined impression.

According to another aspect of the invention, an audio information provision apparatus includes the above-described play list generation device; and a reproduction device for reproducing audio information streams selected by the play list generation device.

According to still another aspect of the invention, a play list generation method for generating a play list of a first set of audio information streams in an order to be reproduced by a reproduction device is provided. The play list generation method includes the steps of receiving a condition of a target to which the first set of audio information streams reproduced by the reproduction device are to be provided; acquiring a transfer information stream which represents a transfer of impressions given to the target by reproduction of a second set of audio information streams in a prescribed order based on the condition; and selecting, from a first plurality of audio information streams stored in a first database, a second plurality of audio information streams which give the target a transfer of impressions proximate to the transfer of impressions represented by the transfer information stream, and generating a play list including the selected second plurality of audio information streams as the first set of audio information streams.

In one embodiment of the invention, the step of receiving the condition includes the step of receiving a number of audio information streams to be included in the play list. The step of generating the play list includes the step of selecting a number of audio information streams equal to the received number of audio information streams, based on a plurality of impressions representing at least a part of the transfer of impressions.

In one embodiment of the invention, the step of receiving the condition includes the step of receiving a reproduction time period of the play list. The step of generating the play list includes the step of selecting the second plurality of audio information streams so that a total reproduction time period of the play list is equal to or less than the received reproduction period, based on a plurality of impressions representing at least a part of the transfer of impressions.

In one embodiment of the invention, the step of receiving the condition includes the step of receiving an image of the play list. The step of acquiring the transfer information stream includes the step of selecting a transfer information stream corresponding to the image.

In one embodiment of the invention, the first database stores a plurality of related information streams respectively corresponding to the first plurality of audio information streams stored in the first database. The plurality of related information streams each have a coordinate value representing a position of the corresponding audio information stream in a prescribed coordinate system defining impressions of audio information streams. The transfer information stream represents a plurality of coordinate values in the prescribed coordinate system. The step of generating the play list includes the step of selecting an audio information stream to be added to the play list, from at least one audio information stream corresponding to at least one related information stream having a coordinate value within a prescribed range from a reference coordinate value which is obtained based on the plurality of coordinate values, based on a distance between the coordinate value included in the at least one related information stream and the reference coordinate value.

In one embodiment of the invention, the step of receiving the condition includes the step of receiving a selection method of an audio information stream. The step of generating the play list includes the step of generating an evaluation expression based on the selection system. The step of selecting an audio information stream to be added to the play list selects the audio information stream further based on the generated evaluation expression.

In one embodiment of the invention, the step of receiving the condition includes the step of receiving satisfaction degree information which represents a satisfaction degree of the target presented by the selected audio information stream. The play list generation method further includes the step of storing time information representing a time when an audio information stream is provided to the target and the satisfaction degree information. The step of selecting an audio information stream to be added to the play list selects the audio information stream further based on at least one of the time information and the satisfaction degree information.

In one embodiment of the invention, the satisfaction degree information further represents the condition of the target and the time when the satisfaction degree is input.

In one embodiment of the invention, the play list generation method further includes the steps of externally receiving an audio information stream and determining an impression of the received audio information stream based on a musical feature of the received audio information stream, and storing the received audio information stream as well as a reproduction time period of the received audio information stream and the determined impression.

In one embodiment of the invention, the play list generation method further includes the step of reproducing the first set of audio information streams.

According to still another aspect of the invention, a program for causing a computer to execute generation processing of a play list of a first set of audio information streams in an order to be reproduced by a reproduction device is provided. The generation processing includes the steps of receiving a condition of a target to which the first set of audio information streams reproduced by the reproduction device are to be provided: acquiring a transfer information stream which represents a transfer of impressions given to the target by reproduction of a second set of audio information streams in a prescribed order based on the condition; and selecting, from a first plurality of audio information streams stored in a database, a second plurality of audio information streams which give the target a transfer of impressions proximate to the transfer of impressions represented by the transfer information stream, and generating a play list including the selected second plurality of audio information streams as the first set of audio information streams.

According to still another aspect of the invention, a computer-readable recording medium storing a program for causing a computer to execute generation processing of a play list of a first set of audio information streams in an order to be reproduced by a reproduction device is provided. The generation processing includes the steps of receiving a condition of a target to which the first set of audio information streams reproduced by the reproduction device are to be provided; acquiring a transfer information stream which represents a transfer of impressions given to the target by reproduction of a second set of audio information streams in a prescribed order based on the condition; and selecting, from a first plurality of audio information streams stored in a database, a second plurality of audio information streams which give the target a transfer of impressions proximate to the transfer of impressions represented by the transfer information stream, and generating a play list including the selected second plurality of audio information streams as the first set of audio information streams.

According to still another aspect of the invention, an audio information provision system including a server for generating a play list of a first set of audio information streams in an order to be reproduced by a reproduction device; and a terminal connected to the server via a network. The terminal includes a condition input section for receiving a condition of a target to which the first set of audio information streams reproduced by the reproduction device are to be provided. The server includes a database storing a plurality of audio information streams, a transfer information stream acquisition section for acquiring a transfer information stream which represents a transfer of impressions given to the target by reproduction of a second set of audio information streams in a prescribed order based on the condition, a play list generation section for generating a play list for selecting, from the first plurality of audio information streams stored in the database, a second plurality of audio information streams which give the target a transfer of impressions proximate to the transfer of impressions represented by the transfer information stream, and generating a play list including the selected second plurality of audio information streams as the first set of audio information streams, and an output section for outputting the generated play list. The terminal includes a storage section for storing the play list received from the server, and the reproduction device for reproducing the first set of audio information streams.

Thus, the invention described herein makes possible the advantages of providing a play list generation device, an audio information provision device, an audio information provision system, and an audio information provision method for providing audio information suitable to the image of the target to which the audio information is to be provided or suitable to the taste of the user without requiring the user to have specialized knowledge on audio information; a program for causing a computer to generate a play list; and a recording medium having such a program recorded thereon.

These and other advantages of the present invention will become apparent to those skilled in the art upon reading and understanding the following detailed description with reference to the accompanying figures.

BRIEF DESCRIPTION OF THE DRAWINGS

FIG. 1B is a flowchart illustrating an operation of a play list generation device in the audio information provision apparatus shown in FIG. 1A:

FIG. 2A shows an image input section in the audio information provision apparatus shown in FIG. 1A:

FIG. 4A shows a coordinate system according to the first example of the present invention;

FIG. 5 shows an audio information database in the audio information provision apparatus shown in FIG. 1A;

DESCRIPTION OF THE EMBODIMENTS

Hereinafter, the present invention will be described by way of illustrative examples with reference to the accompanying drawings.

In this specification, the term "song" is defined to refer to a tune with or without lyrics. The "user" inputs data for determining audio information streams to be included in a play list. The "target" is a person or group of people to which the audio information streams are to be provided. The user may or may not be a target.

EXAMPLE 1

Figure 1A:
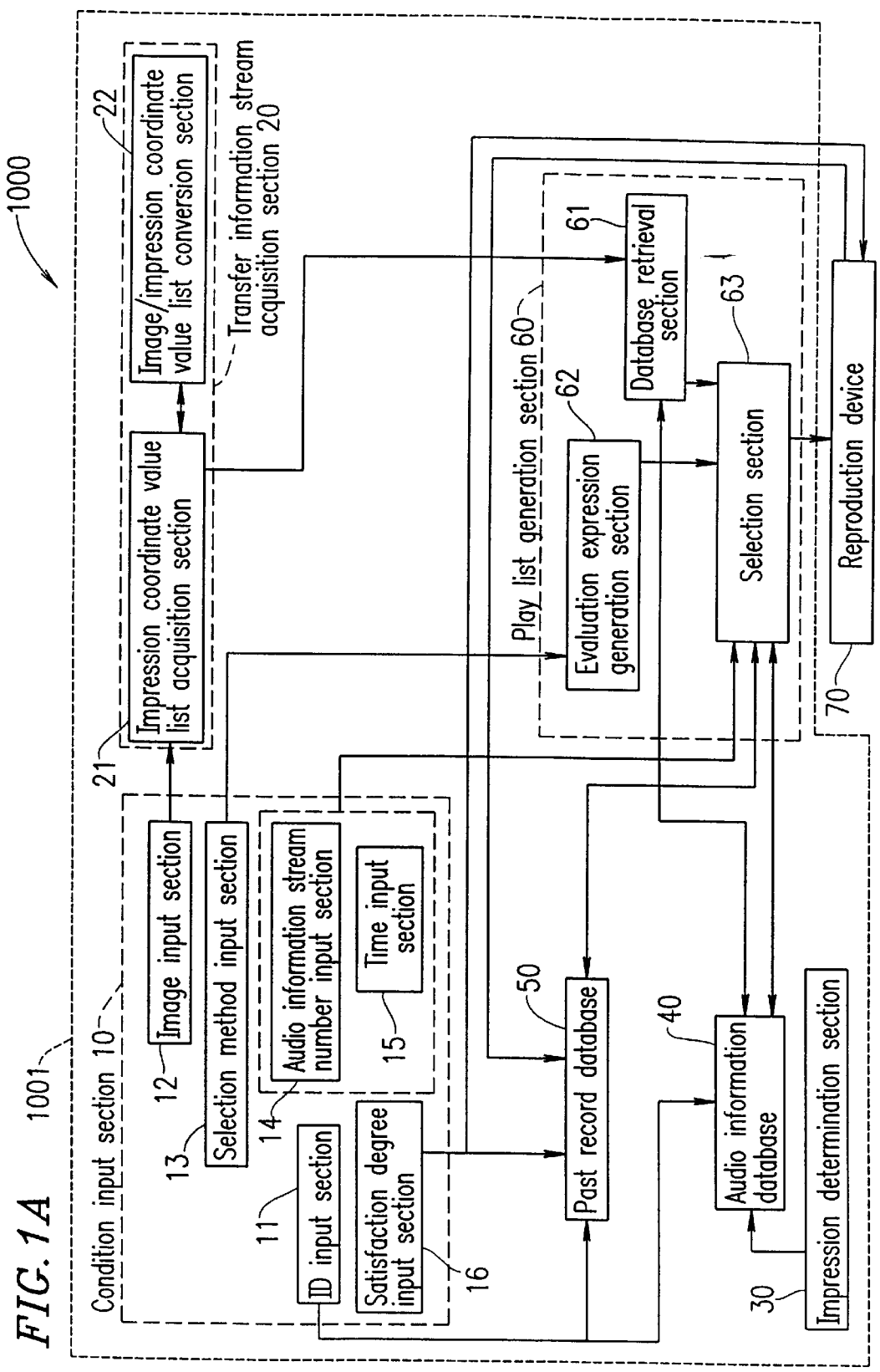
FIG. 1A shows an audio information provision apparatus according to a first example of the present invention.

FIG. 1A shows an audio information provision apparatus 1000 according to a first example of the present invention. The audio information provision apparatus 1000 includes a play list generation device 1001 and a reproduction device 70. The play list generation device 1001 generates a play list which represents an order of a set of audio information streams to be reproduced by the reproduction device 70. The reproduction device 70 reproduces the set of audio information streams in accordance with the order represented by the play list. In this specification, the term "audio information" refers to information including audio contents such as songs, audio data, sound effects and the like.

The play list generation device 1001 includes an audio information database 40 storing a plurality of audio information streams, a condition input section 10, a transfer information stream acquisition section 20, and a play list generation section 60 for generating a play list.

FIG. 1B is a flowchart illustrating an operation of the play list generation device 1001. The sections referred to in the following description of the operation of the play list generation device 1001 are shown in FIG. 1A.

In step S11, the user inputs conditions of a target to a condition input section 10.

In step S12, based on the input conditions, the transfer information stream acquisition section 20 acquires a transfer information stream which represents a transfer of impressions which is determined by specialists as being prescribed audio information streams reproduced in a prescribed order.

In step S13, the play list generation section 60 selects a plurality of audio information streams, which provide a transfer of impressions proximate to the transfer of impressions represented by the acquired transfer information stream, from the plurality of audio information streams stored in the audio information database 40. Then, the play list generation section 60 generates a play list including the selected plurality of audio information streams as the set of audio information streams.

The condition input section 10 includes an ID input section 11, an image input section 12, a selection method input section 13, an audio information stream number input section 14, a time input section 15, and a satisfaction degree input section 16.

The ID input section 11 allows the user to input individual information including the user name, user number, password, and the like, which are input from the user as individual ID information. Using the individual ID information, the individual data of the user can be used to reference the data stored in the audio information database 40 and a past record database 50.

FIG. 2A shows an example of the image input section 12. The image input section 12 shown in FIG. 2A presents the user with a plurality of options for items such as, for example, the season, time, location at which the audio information is reproduced, and purpose for reproducing the audio information. The user selects one of the options for each item, and thus inputs an image of a desired play list.

The image of audio information streams included in the desired play list is determined based only on a combination of the selected options, and is represented by a combination of codes assigned to the selected options. Such a combination of codes is referred to as an "image code". The generated image code is input to the impression coordinate value list acquisition section 21.

One of the items used for determining the image of the desired play list may be, for example, "DJ's name". By selecting the name of a famous DJ, a play list having a selection pattern similar to the DJ's selection pattern can be generated.

Figure 2B:
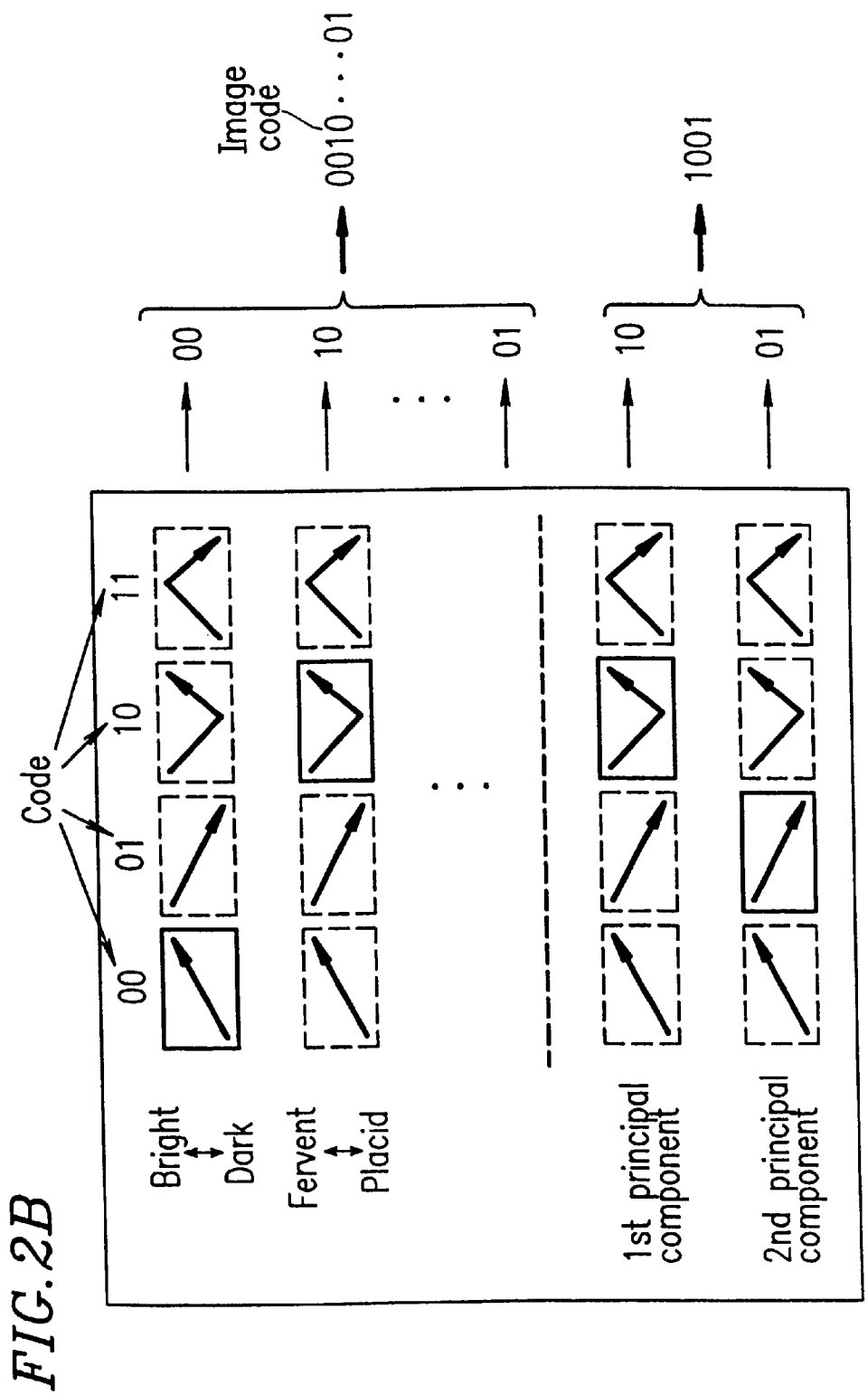
FIG. 2B shows an alternative image input section in the audio information provision apparatus shown in FIG. 1A.

FIG. 2B shows another example of the image input section 12. The image input section 12 shown in FIG. 12B allows the user to select an over-time transfer of parameters. The parameters are, for example, adjectives representing images given by audio information streams such as "bright⇌dark" and "fervent⇌placid". Alternatively, the parameters are adjectives representing the tempos of audio information streams such as "fast⇌slow". The user inputs a transfer of parameters he/she desires for the play list by selecting a code assigned to the corresponding button or the like. For example, the user selects code 00 in the option "bright⇌dark" when he/she wants a play list in which the first songs give a dark image, which are followed by songs gradually giving a bright image. The user selects code 10 in the option "fervent⇌placid" when he/she wants a play list which starts with songs giving a fervent image, followed by songs giving a placid image, which are then followed by songs giving a fervent image. An image code is generated by a combination of these codes.

Some users may find it troublesome to set many parameters. In order to reduce the number of parameters set by the user and thus to reduce the number of operation steps conducted by the user, representative parameters among many parameters or Principal Component parameters obtained by Principal Component Analysis or the like (for example, first and second Principal Component parameters shown in FIG. 2B) may be presented as options.

In the example shown in FIG. 2B, the parameters change in four different manners (codes 00, 01, 10 and 11), but may be set to change in more complicated manner.

Figure 3:
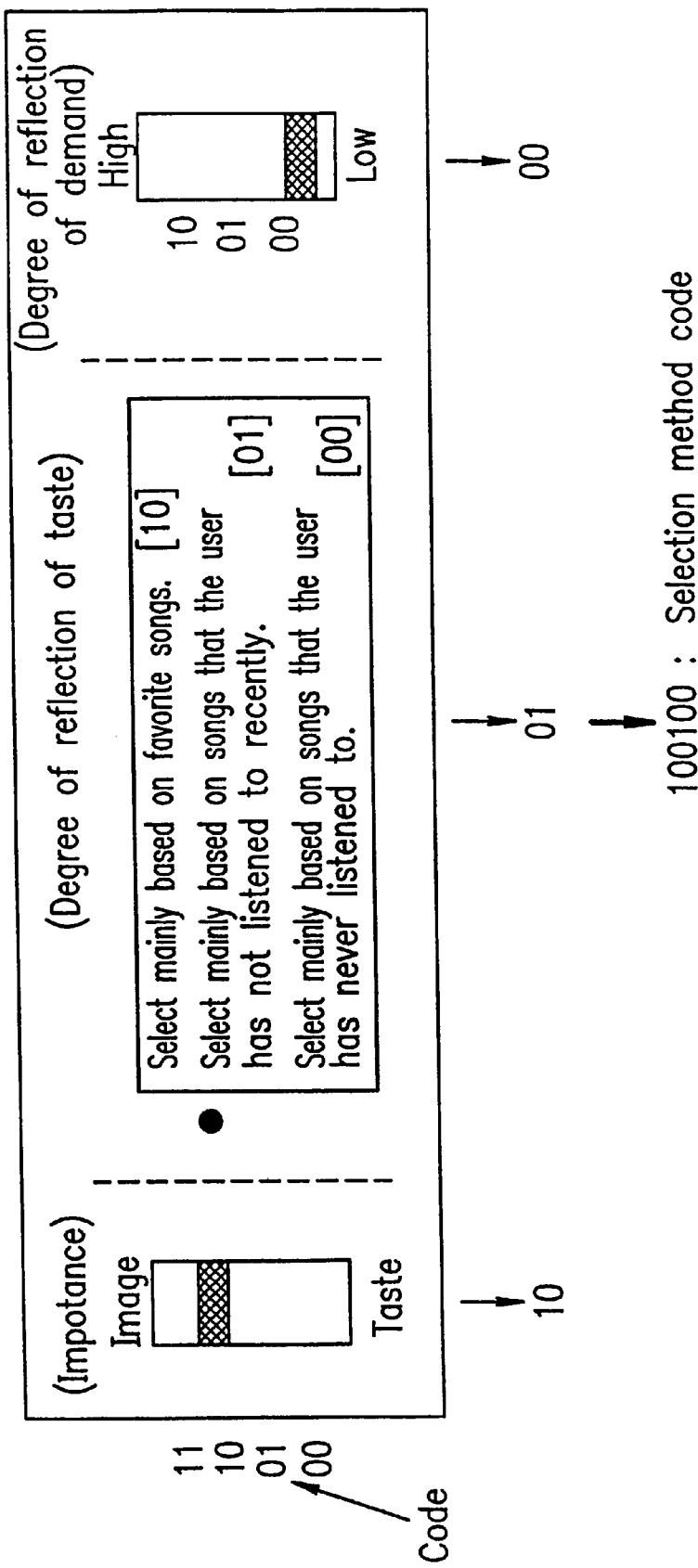
FIG. 3 shows a selection method input section in the audio information provision apparatus shown in FIG. 1A.

FIG. 3 shows an example of the selection method input section 13. The selection method input section 13 allows the user to input a selection method that the user desires to use for selecting audio information streams in the play list. The selection method is represented by the "importance", "degree of reflection of taste" and "degree of reflection of demand".

The "importance" shows whether the desired image or the taste of the user is given priority in searching for the audio information streams. The scale of the "importance" is divided into four stages, and a code is assigned to each stage.

The "degree of reflection of taste" allows the user to select one of the options of "select mainly based on favorite songs", "select mainly based on songs that the user has not listened to recently" and "select mainly based on songs that the user has never listened to". A code is assigned to each option.

The "degree of reflection of demand" allows the user to determine whether "the user wants the audio information streams precisely matching his/her demand" or "the user leaves the selection of audio information streams to the device to some extent". When the "degree of reflection of demand" is relatively high, the generated play lists reflect the user's demand quite well at a relatively high probability. However, all the play lists generated for the same image tend to include the same audio information streams. When the "degree of reflection of demand" is relatively low, the generated play lists tend to basically reflect the user's demand. Moreover, even the play lists generated for the same image tend to include different audio information streams. The scale of the "degree of reflection of demand" is also divided into four stages, and a code is assigned to each stage.

The selection method is determined based only on a combination of the above-mentioned three types of codes. Such a combination of codes is referred to as a "selection method code". The generated selection method code is input to an evaluation expression generation section 62. Then, an evaluation expression is generated based on the generated selection method.

In the above-described example, the scale of the "importance" and the scale of the "degree of reflection of demand" are each divided into four stages. The number of stages may be changed by changing the setting of the evaluation expression generation section 62. Even when these options are not input, the evaluation expression generation section 62 may still operate by the default setting.

The audio information stream number input section 14 allows the user to input the number of audio information streams that the user wants to include in the play list. The audio information stream number specified by the user is input to the selection section 63. The selection section 63 generates a play list which fulfills the specified number of audio information streams without changing the transfer of impressions of the entire play list represented by the transfer information stream.

The time input section 15 allows the user to specify a reproduction time period of the play list desired by the user. The reproduction time period specified by the user is input to the selection section 63. The selection section 63 generates a play list which fulfills the specified reproduction time period without changing the transfer of impressions of the entire play list represented by the transfer information stream.

Usually in this example, the audio information stream number and the reproduction time period are not input simultaneously. Even without the audio information stream number or the reproduction time period being input, the play list generation device 1001 can still operate.

The satisfaction degree input section 16 has a skip button. The user clicks the skip button when the image of the audio information stream currently selected is different from the image he/she desires. By clicking the skip button, the user can register the audio information stream currently selected, the image currently specified, and the current time in the past record database 50. These pieces of information are collectively referred to as "satisfaction degree information". After this step, the selection section 63 can avoid selecting the same audio information stream in the case where the satisfaction degree information is registered on the audio information stream which was selected in the past for the same image.

By clicking the skip button, the user can instruct the reproduction device 70 to stop reproducing the currently played audio information stream and to reproduce the next audio information stream in the play list.

The transfer information stream acquisition section 20 includes an impression coordinate value list acquisition section 21 and an image/impression coordinate value list conversion section 22.

In order to provide continuous audio information streams suitable to the image desired by the user, the impression coordinate value list acquisition section 21 acquires, from an image/impression coordinate value list conversion section 22, an impression coordinate value list including impression coordinate values suitable to the image desired by the user arranged time-wise.

The impression coordinate value and the impression coordinate value list will be described.

An impression coordinate value is a value in a coordinate system representing a subjective impression regarding an audio information stream such as "bright", "fervent", "refreshing"and "sharp". The coordinate system defines the impression of the audio information stream. An example of the coordinate system is shown in FIG. 4A. As shown in FIG. 4A, terms representing an impression such as "bright" and "dark" are used in the coordinate system, and each axis of the coordinate system represents the degree between two opposite impressions (e.g., "bright" and "dark", and "fervent"and "placid"). In the coordinate system shown in FIG. 4A, the audio information stream at the impression coordinate value $\alpha$ gives a bright and fervent impression. Each axis may represent the degree between two other opposite impressions such as, for example, "sharp" and "soft", or the degree of a single impression such as, for example, "refreshing". The impression coordinate value includes items regarding a plurality of subjective impressions of music, and therefore the impression represented by an impression coordinate value can be expressed by a vector.

The coordinate system shown in FIG. 4A is two-dimensional for the sake of simplicity, but a three-dimensional coordinate system may be used.

Figure 4B:
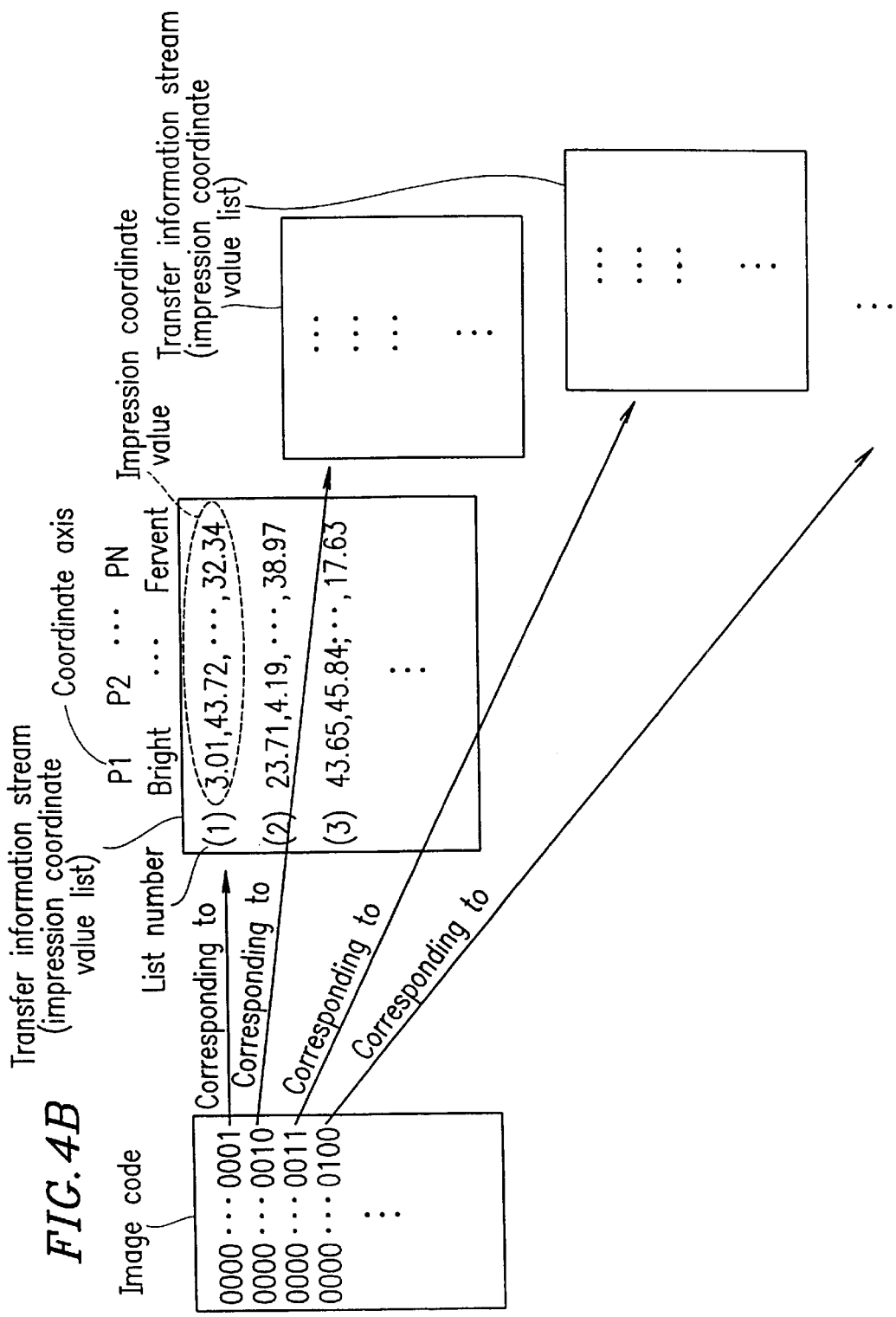
FIG. 4B shows the relationship between the image code and the impression coordinate value list according to the first example of the present invention.

FIG. 4B shows a transfer information stream representing a transfer of impressions given by a set of audio information streams. The transfer information stream is represented by an impression coordinate value list. The impression coordinate value list includes a plurality of impression coordinate values arranged time-wise. The coordinate system in FIG. 4A shows a transfer of impressions represented by a transfer information stream and impression coordinate values included in an impression coordinate value list. The impression coordinate values are represented by star marks. As can be appreciated from FIG. 4A, the impression coordinate values included in a specific impression coordinate value list go along the transfer of impressions represented by the transfer information stream. A transfer of impressions represented by a specific transfer information stream can be provided by reproducing a prescribed set of audio information streams having the impression coordinate values included in the corresponding impression coordinate value list.

The prescribed set of audio information streams may be an ideal set of audio information streams having impression coordinate values exactly matching the impression coordinate values included in the corresponding impression coordinate value list. The prescribed set of audio information streams may be a virtual set of audio information streams. Even a set of audio information stream shaving impression coordinate values which are proximate to the impression coordinate values included in the impression coordinate value list can give the same impression as the prescribed set of audio information streams. The play list generation section 60 generates a play list by selecting audio information streams corresponding to the impression coordinate values which are proximate to the impression coordinate values included in the impression coordinate value list.

Conventionally, audio information streams included in one play list generated to be suitable to the image desired by the user provide only one impression. For example, when an image of "bright" is input, the generated play list includes only audio information streams providing the "bright" image. In this example, impression coordinate values are arranged time-wise in an impression coordinate value list. Therefore, a set of audio information streams are reproduced in the order included in the play list. Thus, the impression of "lifting the listener's spirit" can be provided by reproducing audio information streams which become gradually and increasingly fervent. The impression of "changing the listener's mood" can be provided by reproducing a plurality of audio information streams giving a similar impression and then reproducing an audio information stream providing a different impression.

The impression coordinate values arranged time-wise each have a list number. The impression coordinate value list is input to the play list generation section 60. The play list generation section 60 generates a play list by selecting, from the audio information database 40, audio information streams corresponding to the impression coordinate values which are proximate to the impression coordinate values of all or a part of the list numbers in the impression coordinate value list.

The impression coordinate value list acquisition section 21 inputs an image code which is input from the image input section 12 to the image/impression coordinate value list conversion section 22 so as to refer to pre-registered impression coordinate value lists. The image/impression coordinate value list conversion section 22 includes impression coordinate value lists corresponding to all the patterns of image codes, one to one. The impression coordinate value lists may be manually created by specialists or produced by, for example, an automatic analysis performed by analyzing the selection pattern of audio information streams of famous DJs or CDs.

The generated impression coordinate value lists and the image codes are input to a database retrieval section 61. The database retrieval section 61 uses an impression coordinate value of each list number as a key for retrieving, from the audio information database 40, a plurality of candidate audio information streams for each list number.

The impression determination section 30 is used for registering a new audio information stream in the audio information database 40 as follows. First, a reproduction time period is calculated based on the input audio information stream. Next, the musical features of the audio information stream including the tempo, code progression and formation of instruments are automatically extracted. Using the musical features, the impression coordinate value of the audio information stream is calculated. The input audio information stream is input to the audio information database 40 together with a related information stream representing the impression coordinate value and the reproduction time period of the input audio information. Any format of audio information may be input to the impression determination section 30, including the CD recording format, WAV, and MP3.

FIG. 5 shows audio information streams and related information streams related thereto which are both stored in the audio information database 40. The audio information streams stored in the audio information database 40 are each provided with an audio information stream number. An index abstract, or the like of the contents of each audio information stream may also be stored as a part of the related information stream. In this case, a certain audio information stream can be prevented from being provided to a certain user based on the ID which is input to the ID input section 11.

Figure 6:
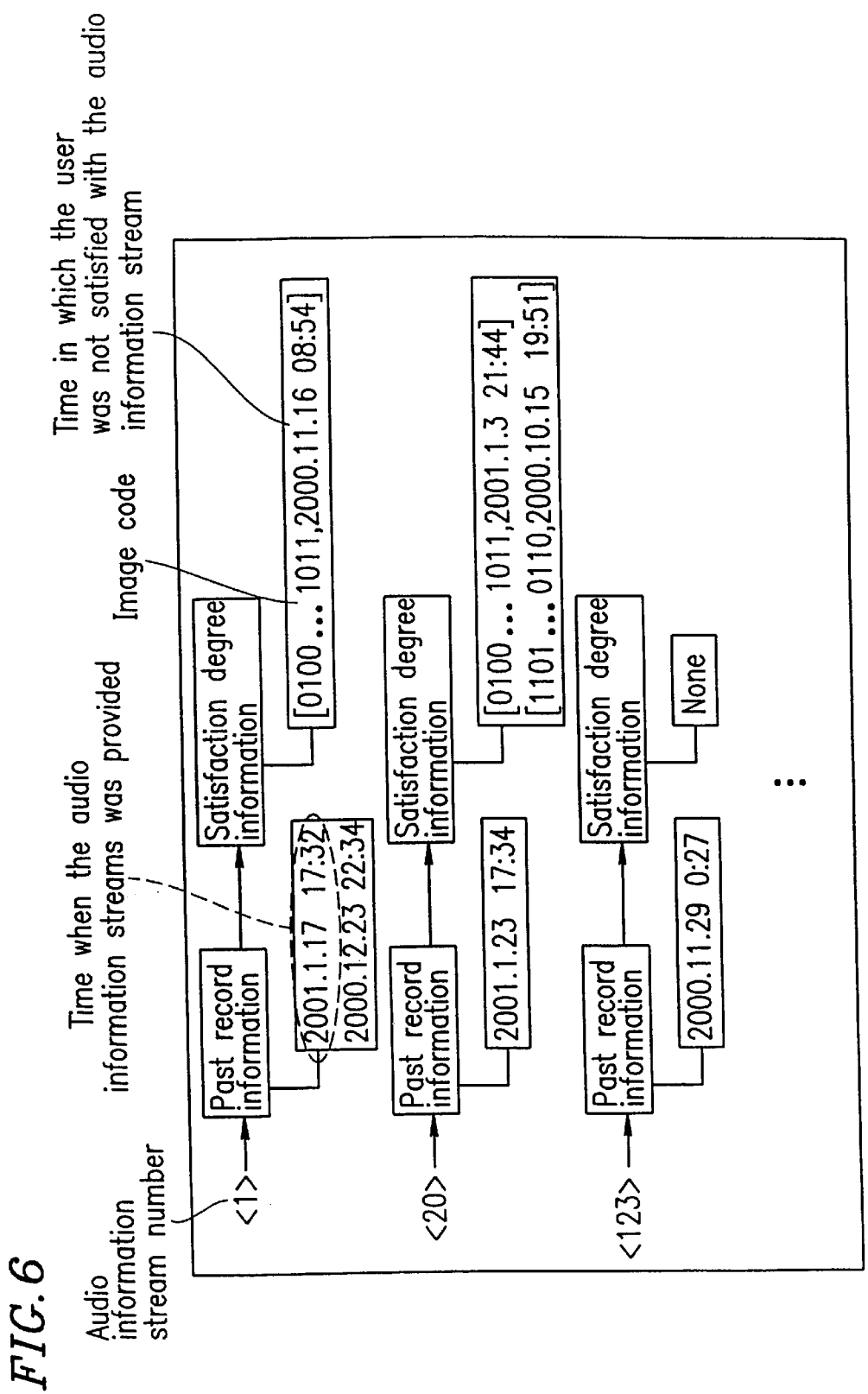
FIG. 6 shows a past record database in the audio information provision apparatus shown in FIG. 1A.

FIG. 6 shows past record information and satisfaction degree information stored in the past record database 50. The past record database 50 holds audio information stream numbers of the audio information streams provided to the users in the past, as well as past record information and satisfaction degree information of the user regarding each of the audio information streams. The past record information and the satisfaction degree information are stored for each ID input to the ID input section 11. The past record information represents the time (date and time) in a prescribed time period when the user listened to the corresponding audio information stream. Based on the past record information, the number of times the user listened to the audio information stream during the prescribed time period can be found. The satisfaction degree information represents the image code and time of the case where the user was not satisfied with the audio information stream selected in a prescribed time period for the image desired by the user. The satisfaction degree information is input to the past record database 50 by the user clicking the skip button of the satisfaction degree input section 16. The past record information and the satisfaction degree information represent the user's taste, and are reflected to an evaluation value, which is a criterion used by the selection section 63 for selecting audio information streams.

The past record information and the satisfaction degree information stored in the past record database 50 are held only for a restriction time period. After the elapse of the restriction time period, the past record information and the satisfaction degree information are automatically deleted.

The play list generation section 60 includes the database retrieval section 61, the evaluation expression generation section 62, and the selection section 63.

Figure 7:
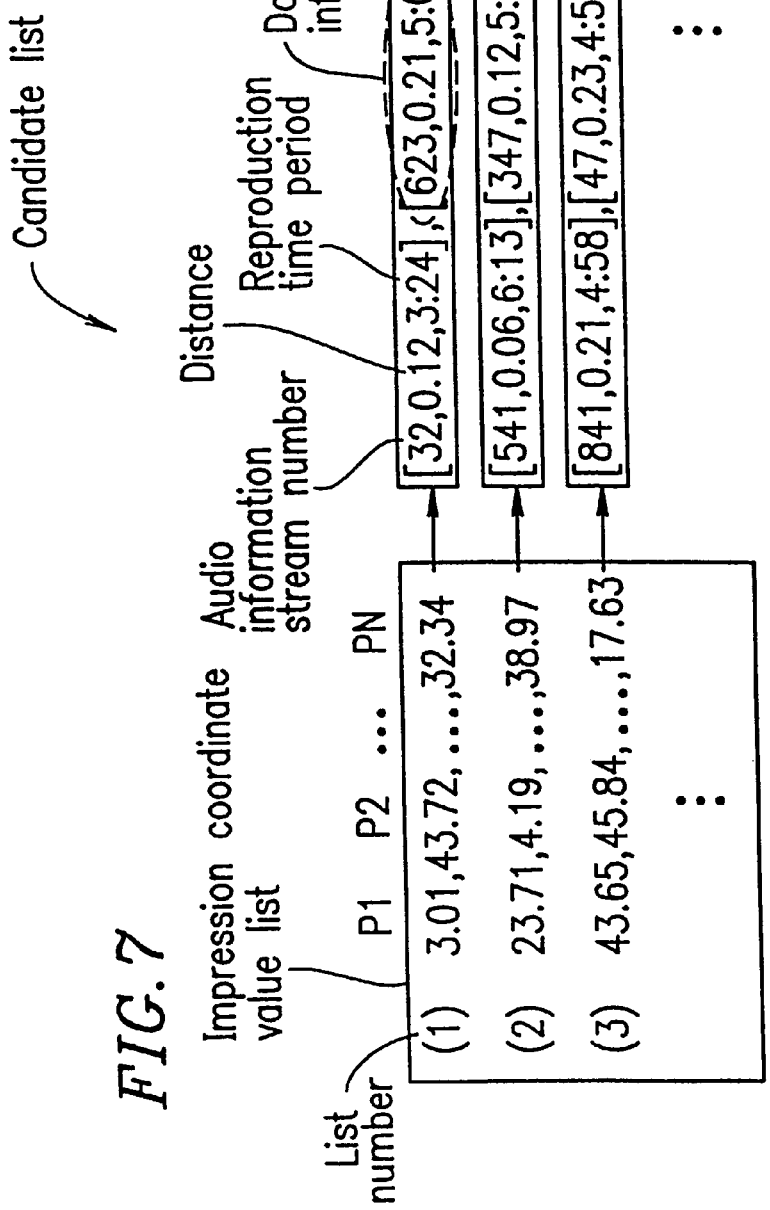
FIG. 7 shows a candidate list according to the first example of the present invention.

The database retrieval section 61 receives the impression coordinate value list acquired by the impression coordinate value acquisition section 21. The database retrieval section 61 uses an impression coordinate value of each list number in the input impression coordinate value list as a key for determining the number of audio information streams to be retrieved for each impression coordinate value and then searching the audio information database 40. As a result of the search, the database retrieval section 61 acquires audio information stream numbers of the retrieved audio information streams, and the Euclid distance between the impression coordinate value of each retrieved audio information stream and an impression coordinate value used as the key. When the user inputs a reproduction time period to the time input section 15, the database retrieval section 61 also acquires the reproduction time period. FIG. 7 shows a candidate list, which includes the impression coordinate value list including a plurality of list numbers and data regarding a plurality of retrieved audio information streams corresponding to each list number. The data regarding each audio information stream includes the audio information stream number and the Euclid distance (and the reproduction time period). Each audio information stream included in the candidate list is referred to as a "candidate audio information stream". The candidate list is input to the selection section 63, and a play list is generated from the candidate list. The image code is also input to the selection section 63 via the transfer information stream acquisition section 20 and the database retrieval section 61.

In this example, the distance between the impression coordinate values is defined by the Euclid distance, but other expression for calculating the distance may be used.

The evaluation expression generation section 62 will be described. When the selection method code is input from the selection method input section 13, the evaluation expression generation section 62 generates an evaluation expression corresponding to the selection system code. An evaluation expression includes an "evaluation function expression"and a"selection rule". The evaluation function expression is used for calculating an evaluation value which is used for selecting audio information streams. The evaluation value is calculated based on an impression evaluation value and a past record evaluation value. The impression evaluation value is obtained based on the distance between the impression coordinate value of an audio information stream stored in the audio information database 40 and a reference impression coordinate value in the impression coordinate value list. The past record evaluation value is obtained based on the past record information and the satisfaction degree information stored in the past record database 50. The form and coefficients of the evaluation function expression are determined in accordance with the selection method code. The "selection rule" is used to determine audio information streams to be selected using the evaluation value, and is determined in accordance with the selection method code. A plurality of evaluation function expressions and a plurality of selection rules may be registered in advance in the evaluation expression generation section 62. In this case, the evaluation expression generation section 62 selects an appropriate evaluation function expression and an appropriate selection rule from the plurality of evaluation function expressions and selection rules, based on the selection method code.

Figure 8:
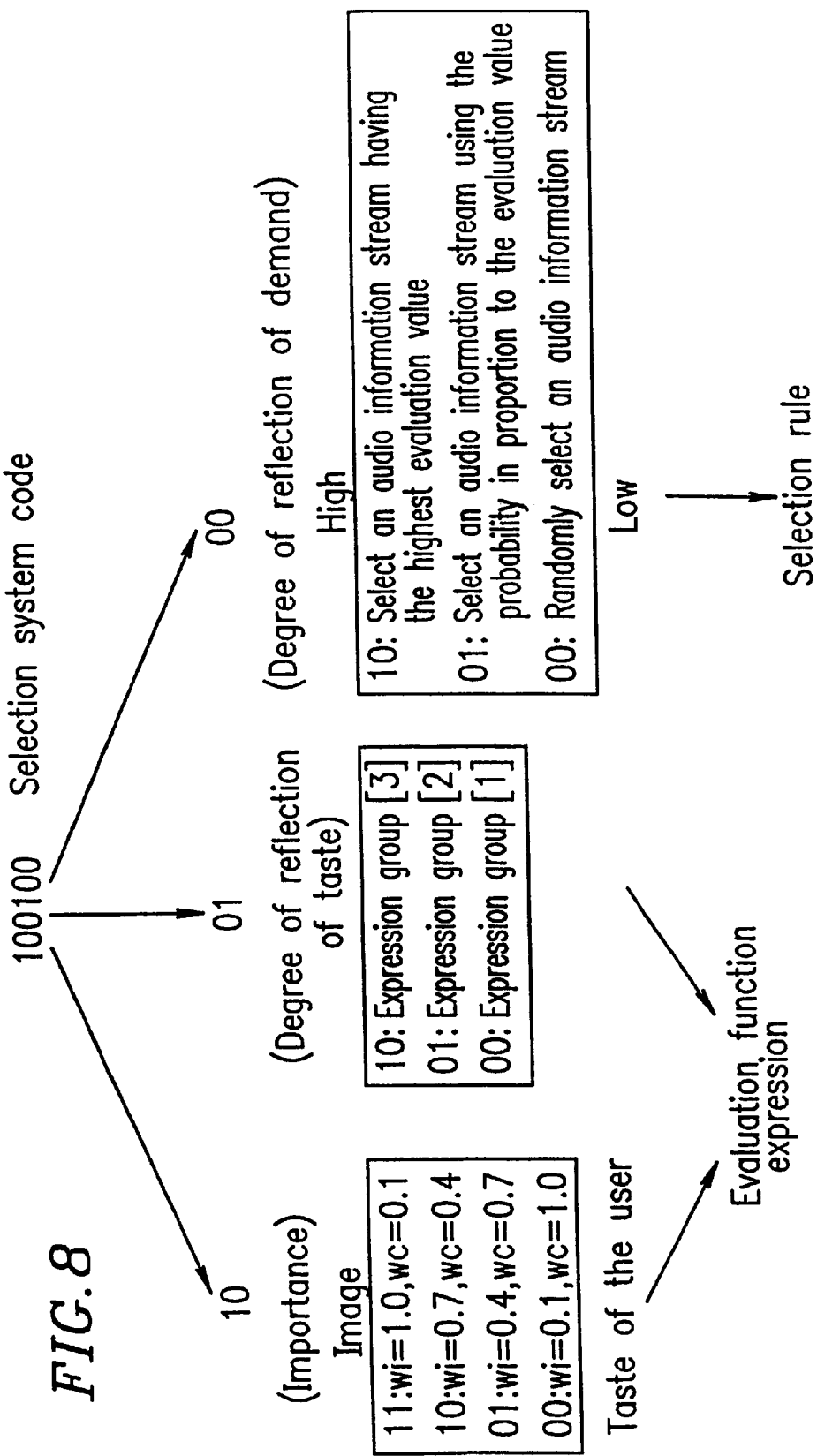
FIG. 8 shows the relationship between the selection method code, the evaluation function expression and the selection rule according to the first example of the present invention.

FIG. 8 shows the relationship among the selection method code, the evaluation function expression and the selection rule.

When the user does not input the selection method to the selection method input section 13, the default for generating an evaluation expression is set, for example, as follows. Regarding the importance, the image is given priority over the taste of the user (code 11). The degree of reflection of taste is set to "select mainly based on favorite songs"(code 10). The degree of reflection of demand is set to be low (code 00). With this setting, audio information streams which fulfills the user's image to some extent are selected with no other restricting conditions. Therefore, play lists produced for the same image can include different audio information streams.

The evaluation function expression used for calculating a total evaluation value E(x) regarding a certain audio information stream x is represented by expression (1).

$$E(x)=wi*Ei(x)+wc*Ec(x)+0.01 \quad (1)$$

where Ei(x) represents the impression evaluation value, and Ec(x) represents a past record evaluation value. wi and wc are each a weight which is determined in accordance with the selection method code. Specifically, when the image is given priority over the taste of the user, wi is set to be larger than wc. When the taste of the user is given priority over the image, wi is set to be smaller than wc. In expression (1), "+0.01" in the right side indicates that a small amount is added to the evaluation value. The amount of "+0.01" is added for the following purpose. When Ei(x)=0.0 and Ec(x)=0.0 regarding all the audio information streams in the candidate list, all the evaluation values become 0.0. This means there is no audio information stream to be selected, and as a result, the play list generation section 60 does not operate. The amount of "+0.01" is added in order to avoid this.

The impression evaluation value Ei(x) is represented by expression (2).

$$Ei(x)=\max(d'-d(x), 0) \quad (2)$$

where d(x) is the distance between the impression coordinate value of the candidate audio information stream and an impression coordinate value used as the key, and d' (constant) is the maximum possible tolerance of the distance d(x) for evaluation. According to expression (2), audio information streams having an impression coordinate value closer to the impression coordinate value used as the key have larger evaluation values.

The past record evaluation value Ec(x) is defined as follows. The latest time at which the audio information stream was reproduced is represented as pt(x), the number of times the audio information stream was reproduced is represented as pc(x), and the satisfaction degree with the audio information streams selected in the past for the image code ic according to the current desire of the user is represented as ps(x, ic). The satisfaction degree represents the time period in which the user was not satisfied with the audio information stream x selected for the image code ic in the past. All the pieces of information regarding time including pt(x) and pc(x) show absolute time. At this point, the past record evaluation value Ec (x) is represented by expression (3).

$$Ec(x)=h(ps(x, ic))*(wct*f(pt(x))+wcc*g(pc(x))) \quad (3)$$

where wct and wcc are each a weight, which are registered in the evaluation expression generation section 60 together with functions f( ), g( ), and h( ).

Where the time at which the past record information is deleted from the past record database 50 is pt(x)', f(pt(x)) can be represented by expression (4).

$$f(pt(x))=pt(x)-pt(x)' \quad (4)$$

In this manner, an evaluation expression according to which audio information streams that the user has recently listened to have larger evaluation values can be generated.

Where the current time is t, f(pt(x)) can be represented by expression (5).

$$f(pt(x))=t-pt(x) \quad (5)$$

In this manner, an evaluation expression according to which audio information streams that the user has not recently listened to have larger evaluation values.

f(pt(x)) can also be represented by expression (6).

$$\text{if } (pt(x)==NULL) \text{ then } f(pt(x))=1 \text{ else } f(pt(x))=0 \quad (6)$$

In this manner, an evaluation expression according to which audio information streams that the user has never listened to have larger evaluation values.

Where the maximum possible number of times the audio information stream can be reproduced by the play list generation device 1001 is pc', g(pc(x)) can be represented by expression (7).

$$g(pc(x))=\min(pc(x), pc') \quad (7)$$

In this manner, an evaluation expression according to which audio information streams that the user often listens to have larger evaluation values.

g(pc(x)) can also be represented by expression (8).

$$\text{if } (pt(x)==NULL) \text{ then } g(pc(x))=0 \text{ else } g(pc(x))=\max(pc'-pc(x), 0) \quad (8)$$

In this manner, an evaluation expression according to which audio information streams that the user does not often listen to have larger evaluation values.

g(pc(x)) can also be represented by expression (9).

$$\text{if } (pt(x)==0) \text{ then } g(pc(x))=1 \text{ else } g(pc(x))=0 \qquad (9)$$

In this manner, an evaluation expression according to which audio information streams that the user has never listened to have larger evaluation values.

The satisfaction degree ps(x, ic) can be represented by expression (10).

$$\text{if } (ps(x, ic)==\text{NULL}) \text{ then } h(ps(x, ic))=1 \text{ else } h(ps(x, ic))=0 \qquad (10)$$

In this manner, the audio information stream which the user rejected in the past for the same image can be avoided from being selected. The evaluation values are calculated in accordance with the evaluation expressions as described above.

Next, the selection rule will be described. The selection rule is, for example, "select an audio information stream having the highest evaluation value", "select an audio information stream using the probability in proportion to the evaluation value", or "randomly select an audio information stream".

When an audio information stream having the highest evaluation value is selected among the candidate audio information streams, the desire of the user can be reflected to the maximum. When an audio information stream is selected using the probability in proportion to the evaluation value, the desire of the user can be reflected to some extent. When an audio information stream is randomly selected, play lists generated for the same image can include different audio information streams.

Hereinafter, each item shown in FIG. 3 will be specifically described.

"Importance" is reflected in the coefficient for the "impression evaluation value" and the "past record evaluation value" in the evaluation function expression; i.e., "importance" is reflected in whether wi or wc is larger in expression (1). When the image is given priority, wi is larger; and when the taste of the user is given priority, wc is larger.

The "degree of reflection of taste" is reflected in selection of the expression used to determine the "past record evaluation value". Namely, the following expressions are used for the function f(pt(x)) in expression (3) in accordance with the degree. Expression (4) is used for the function f(pt(x)) when selection is performed "mainly based on favorite songs (code 10)". Expression (5) is used for the function f(pt(x)) when selection is performed "mainly based on songs that the user has not listened to recently (code 01)". Expression (6) is used for the function f(pt(x)) when selection is performed "mainly based on songs that the user has never listened to (code 00)".

The "degree of reflection of demand" is reflected in selection of the "selection rule". When the degree is "high (code 10)", the rule of "selecting an audio information stream having the highest evaluation value" is used. When the degree is medium (code 01)", the rule of "selecting an audio information stream using the probability in proportion to the evaluation value" is used. When the degree is "low (code 00)", the rule of "randomly selecting an audio information stream" is used.

The evaluation function expressions and the selection rule generated as described above are input to the selection section 63 collectively as the evaluation expression and are used for calculating evaluation values and selecting audio information streams.

The selection section 63 selects an audio information stream to be actually reproduced from the candidate audio information streams generated by the database retrieval section 61. The selection section 63 then retrieves the selected audio information stream from the audio information database 40 and thus generates a play list.

The selection section 63 performs two-stage processing. In the first stage, the selection section 63 selects a list number in the entire candidate list (list number selection processing). In the second stage, the selection section 63 selects an audio information stream from the audio information streams corresponding to each of the list numbers (audio information stream selection processing).

The list number selection processing is performed differently in accordance with whether (1) the user does not input any data to the audio information stream number input section 14 or the time input section 15 of the condition input section 10, (2) the user inputs data to the audio information stream number input section 14, and (3) the user inputs data to the time input section 15.

In the audio information stream selection processing, an audio information stream is basically selected with the same criteria in cases (1), (2) and (3) in accordance with the evaluation expression generated by the evaluation expression generation section 61. In case (3) in which the user inputs data to the time input section 15, however, the range of selection may be limited due to the relationship between the remaining reproduction time period of the play list and the reproduction time period of candidate audio information streams.

The audio information stream selection processing is performed as follows.

The selection section 63 calculates an evaluation value of each candidate audio information stream in accordance with the evaluation function expression which is input from the evaluation expression generation section 62. Using the evaluation value as the criterion for selection, the selection section 63 selects an audio information stream from the candidate audio information streams in accordance with the selection rule which is input from the evaluation expression generation section 62.

The distance d(x) between the impression coordinate value of the candidate audio information stream and an impression coordinate value used as the key is substituted in the evaluation function expression, thereby calculating an evaluation value. When the past record database 50 includes past record information of the audio information stream for which the evaluation value is to be calculated, the latest time at which the audio information stream was reproduced (represented as pt(x)), the number of times the audio information stream was reproduced (represented as pc(x)), and the satisfaction degree with the audio information streams selected in the past for the image code ic according to the current desire of the user (represented as ps (x, ic)) are also substituted in the evaluation function expression, in order to calculate an evaluation expression. The evaluation expression is calculated for all the audio information streams corresponding to the list number selected by the list number selection processing. The selection section 63 recognizes the evaluation values of all the audio information streams corresponding to the same list number, selects one audio information stream in accordance with the selection rule, and adds the selected audio information stream to the play list.

The audio information stream selection processing may be set so that an audio information stream which is already selected for the current play list is not re-selected.

Next, play list generation processing, which includes the list number selection processing and the audio information stream selection processing, will be described.

(1) When the user does not input any data to the audio information stream number input section 14 or the time input section 15, the audio information stream selection processing is performed so as to select one of the audio information streams corresponding to each of all the list numbers included in the candidate list generated by the database retrieval section 61. A play list including these selected audio information streams is generated.

Figure 9:
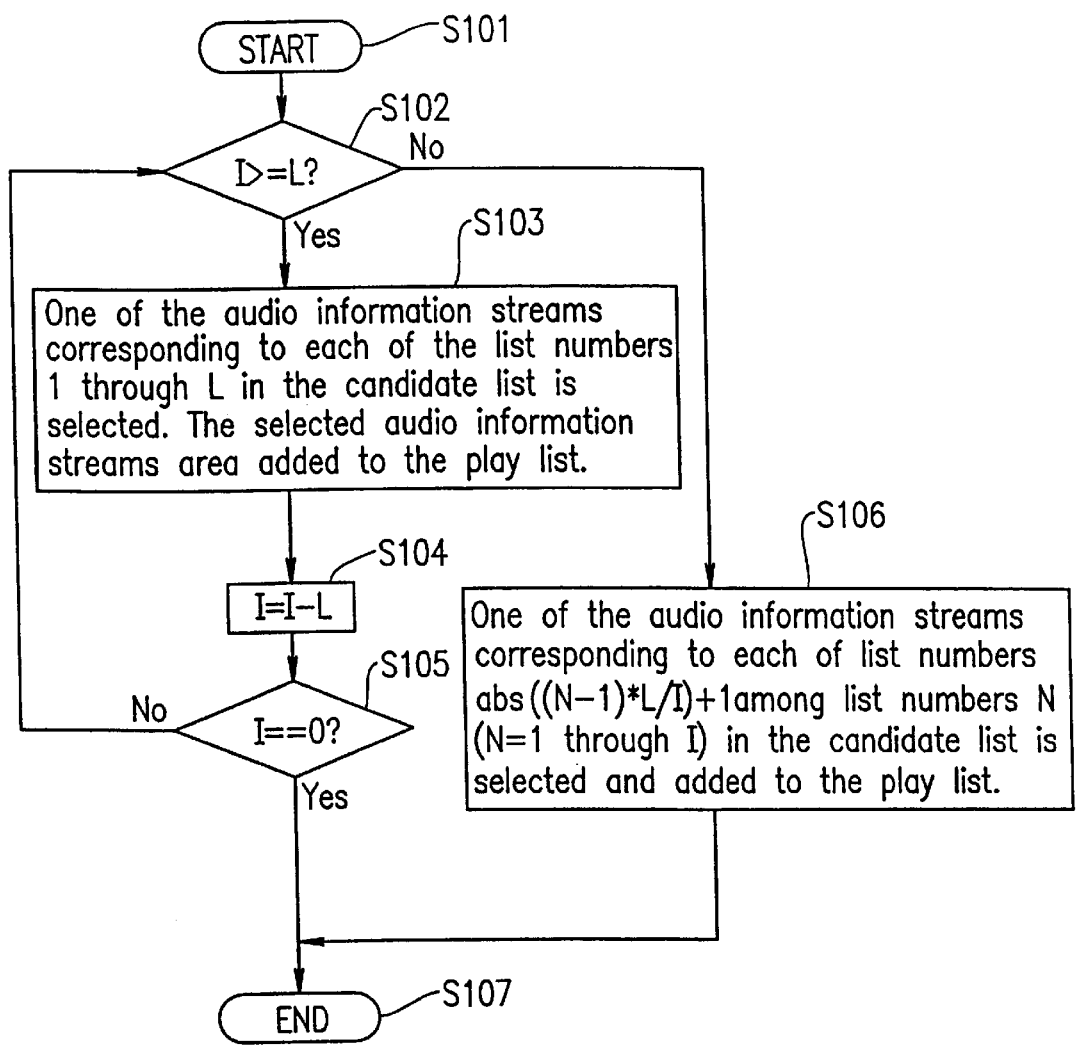
FIG. 9 is a flowchart illustrating play list generation processing performed when the user inputs data to an audio information stream number input section in the audio information provision apparatus shown in FIG. 1A.

(2) When the user inputs data to the audio information stream number input section 14, a plurality of list numbers are selected from all the list numbers included in the candidate list generated by the database retrieval section 61. Then, audio information stream selection processing is performed so as to select one of the audio information streams corresponding to each of the selected list numbers. FIG. 9 is a flowchart illustrating play list generation processing in case (2). Play list generation processing will be described with reference to FIG. 9.

The number of remaining audio information streams to be reproduced (the initial value is the number of audio information stream input by the user) is represented as I, and the number of list numbers is represented as L. In step S102, it is determined whether the number of remaining audio information streams to be reproduced is larger or smaller than the number of list numbers. When the former is determined to be smaller than the latter in step S102, processing advances to step S106. In step S106, a certain number of list numbers are selected at an equal interval, the certain number being equal to the number of remaining audio information streams to be reproduced. Namely, I list numbers are selected from L list numbers. Then, audio information stream selection processing is performed so as to select one of the audio information streams corresponding to each of the selected list numbers. The selected audio information streams are added to the play list. Then, the generation of the play list is terminated (step S107).

When the former is determined to be larger than the latter in step S102, processing advances to step S103. In step S103, audio information stream selection processing is performed so as to select one of the audio information streams corresponding to each of all the list numbers in the candidate list. The selected audio information streams are added to the play list. In step S104, the number of selected audio information streams (L) is subtracted from the remaining number of audio information streams to be reproduced (I). In step S105, it is determined whether or not the number of audio information streams to be reproduced has reached the desired number of audio information streams. When it is determined that the number has reached the desired number in step S105, the generation of the play list is terminated in step S107. When it is determined that the number has not reached the desired number in step S105, processing returns to step S102. The play list generated in this manner includes an equal number of audio information streams to the desired number of audio information streams without changing the transfer of impressions represented by the transfer information stream.

(3) When the user inputs data to the time input section 15, play list generation processing is performed as follows. The desired reproduction time period which is input to the time input section 15 is represented as Td, and the average reproduction time period of audio information streams is represented as Ta. The average reproduction time period need not be a precise value but may be a rough value. The predicted reproduction time period T of the audio information streams selected so far is roughly represented by expression (11). The time period T will be referred to as the "accumulated time period T" for simplicity.

$$T = N * Ta \tag{11}$$

where N represents the number of list numbers in the candidate list for which the audio information stream has already been determined.

Figure 10:
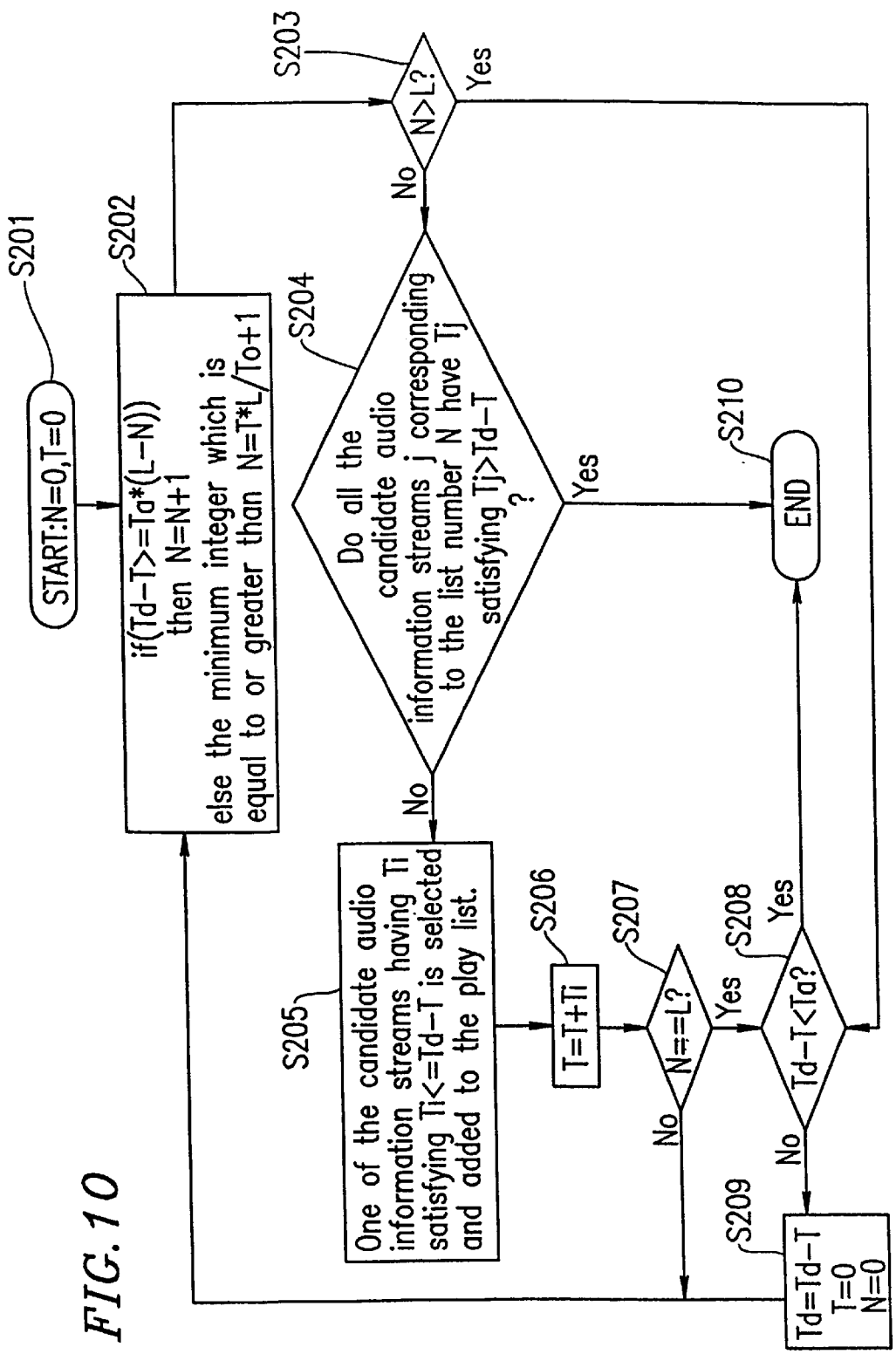
FIG. 10 is a flowchart illustrating play list generation processing performed when the user inputs data to a time input section in the audio information provision apparatus shown in FIG. 1A.

The list number is selected differently in accordance with whether the remaining reproduction time period to be provided is longer or shorter than the predicted reproduction time period. The predicted reproduction time period is obtained by multiplying, by Ta, the number of list numbers larger than the currently selected list number, as shown in FIG. 10. Play list generation processing will be described with reference to FIG. 10. As described below, when the former is shorter than the latter, processing is performed in order to select audio information streams, of which the total reproduction time period is closest to but shorter than the remaining reproduction time period to be provided.

Before the play list generation processing is started (step S201), the number N is 0, and the accumulated time period T is 0.

In step S202, it is determined whether the remaining reproduction time period to be provided is longer or shorter than the predicted reproduction time period. When the former is longer than the latter, the next list number is selected. When the former is shorter than the latter, the remaining list numbers are equally divided. Among the list numbers at the dividing borders, the smallest list number is selected. In step S203, it is determined whether the selected list number is larger or smaller than the number of list numbers (L). When the former is larger than the latter, processing advances to step S208. When the former is smaller than or equal to the latter, one audio information stream having a reproduction time period Ti, which is shorter than the reproduction time period to be provided, is selected from the candidate audio information streams corresponding to the selected list number. Then, the selected audio information stream is added to the play list (steps S204 and S205). When the reproduction time period Tj of every candidate audio information stream is longer than the remaining reproduction time period to be provided, generation of the play list is terminated (step S210).

In step S206, the reproduction time period Ti of the selected audio information stream is added to the accumulated time period T. In step S207, it is determined whether the above-selected list number is equal to the number of list numbers (L) or not. When the two are not equal to each other, processing returns to step S202. When the two are equal to each other, in step S208, it is determined whether the remaining reproduction time period to be provided is longer or shorter than the average reproduction time period Ta. When it is determined that the former is longer than the latter, the variables are changed in step S209 in preparation for selecting audio information streams from the top of the candidate list. When it is determined that the former is shorter than the latter in step S208, generation of the play list is terminated (step S210). The play list generated in this manner has a total reproduction time period which is equal to or less than the desired reproduction time period Td without changing the transfer of impressions represented by the transfer information stream.

Figure 11:
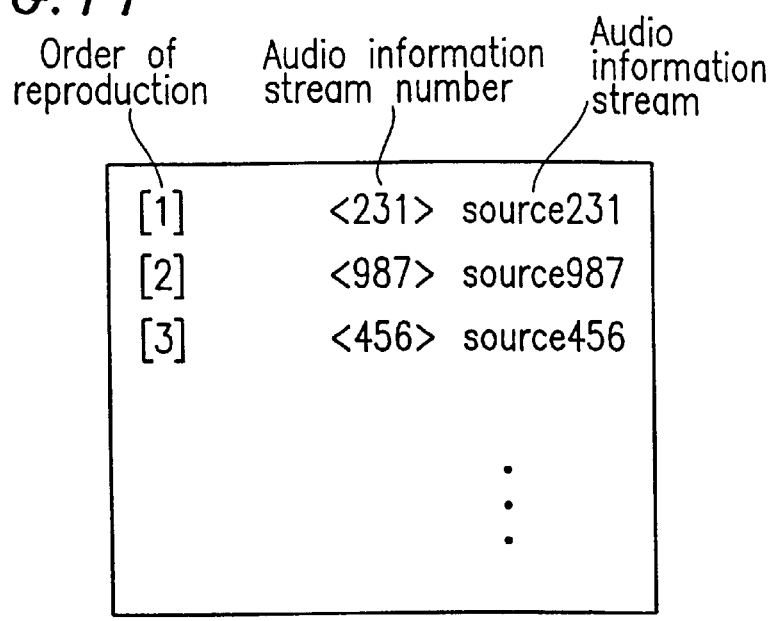
FIG. 11 shows a play list generated by the audio information provision apparatus shown in FIG. 1A.

The audio information streams included in the play list generated in this manner are retrieved from the audio information database 40. FIG. 11 shows an example of the generated play list. The audio information streams included in the play list are input to the reproduction device 70 in accordance with the order of reproduction. The past record information can be updated in accordance with the reproduction performed by the reproduction device 70 by inputting the audio information stream numbers of the audio information streams included in the play list and the current image code to the past record database 50. When the user inputs data to the satisfaction degree input section 16, the satisfaction degree is also updated.

The reproduction device 70 reproduces the audio information streams in accordance with the reproduction order which is input from the selection section 63.

The past record database 50 is necessarily updated when an audio information stream stored in the audio information database 40 is reproduced by the reproduction device 70 as well as when data is input to the condition input section 10.

EXAMPLE 2

Figure 12:
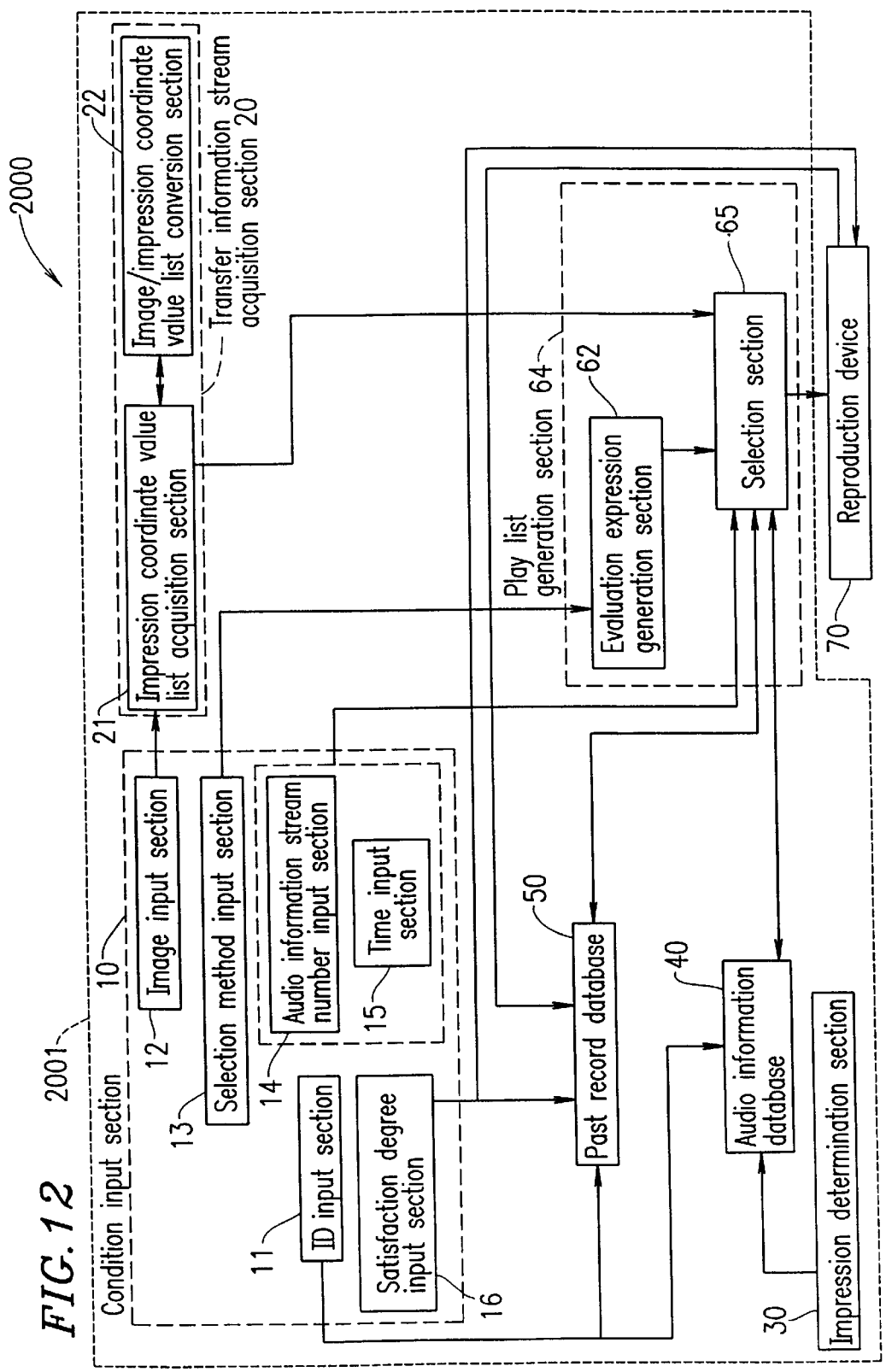
FIG. 12 shows an audio information provision apparatus according to a second example of the present invention.

FIG. 12 shows an audio information provision apparatus 2000 according to a second example of the present invention. The audio information provision apparatus 2000 includes a play list generation section 64 instead of the play list generation section 60. The other elements of the audio information provision apparatus 2000 are the same as those of the audio information provision apparatus 1000. These elements bear identical reference numerals with those of the audio information provision apparatus 1000 and will not be described in detail.

The play list generation section 64 includes an evaluation expression generation section 62 and a selection section 65. An impression coordinate value list which is output from the transfer information stream acquisition section 20 is input to the selection section 65.

The selection section 65 reconstructs the impression coordinate value list generated by the transfer information stream acquisition section 20 in accordance with the audio information stream number or the reproduction time period (impression coordinate value list reconstruction processing). The selection section 65 also selects an audio information stream from the audio information database 40 based on the impression coordinate value registered in the reconstructed impression coordinate value list and the evaluation function expression generated by the evaluation expression generation section 62 (audio information stream selection processing).

First, the audio information stream selection processing will be described. In this example, one of audio information streams corresponding to an impression coordinate value at a certain list number is selected from the audio information database 40. An audio information stream having the shortest Euclid distance described above may be selected. Alternatively, an audio information stream may be selected in accordance with an evaluation function expression generated by the evaluation expression generation section 62. Use of the evaluation function expression allows the audio information stream to be selected in consideration of the past record of the user and the selection method desired by the user. The selection section 65 calculates an evaluation value in accordance with the evaluation function expression, and selects an audio information stream in accordance with the selection rule using the evaluation value as the criterion for selection.

The distance d(x) between the impression coordinate value of the reconstructed candidate audio information stream and an impression coordinate value used as the key is substituted in the evaluation function expression, thereby calculating an evaluation value. When the past record database 50 includes past record information of the audio information stream for which the evaluation value is to be calculated, the latest time at which the audio information stream was reproduced (represented as pt(x)), the number of times the audio information stream was reproduced (represented as pc(x)), and the satisfaction degree with respect to the image code ic suitable to the current desire of the user (represented as ps(x, ic)) are also substituted in the evaluation function expression, in order to calculate an evaluation expression. The evaluation expression is calculated for all the audio information streams corresponding to the list number selected by the list number selection processing. The selection section 63 recognizes the evaluation values of all the audio information streams corresponding to the list number, selects one audio information stream in accordance with the selection rule, and adds the selected audio information stream to the play list.

Next, the impression coordinate value list reconstruction processing will be described. Here, an impression coordinate value which is output by the transfer information stream acquisition section 20 is referred to as a "basic impression coordinate value list", and an impression coordinate value which is generated by the impression coordinate value list reconstruction processing is referred to as a "reproduction impression coordinate value list". The reproduction impression coordinate value list acts as a reference impression coordinate value for performing audio information stream selection processing. The number of lists included in the basic impression coordinate value list is represented as L.

The list number selection processing is performed differently in accordance with whether (1') the user does not input any data to the audio information stream number input section 14 or the time input section 15 of the condition input section 10, (2') the user inputs data to the audio information stream number input section 14, and (3') the user inputs data to the time input section 15.

Next, play list generation processing, which includes the list number selection processing and the audio information stream selection processing, will be described.

(1') When the user does not input any data to the audio information stream number input section 14 or the time input section 15, the reproduction impression coordinate value list is the same as the basic impression coordinate value list. Audio information selection processing is performed in accordance with the basic impression coordinate value list so as to generate a play list. The play list generated in this manner includes the same number of audio information streams as the number of list numbers (L) included in the basic impression coordinate value list.

(2') When the user inputs data to the audio information stream number input section 14, the play list generation processing is performed as follows. The desired number of audio information streams which is specified by the audio information stream number input section 14 is represented as I. Basic list numbers included in the basic impression coordinate value list are each represented as X, and the impression coordinate value of each basic list number X is represented as limp(X) (basic impression coordinate value). Based on limp(X), an impression coordinate value simp(Y) (reproduction impression coordinate value) of a reproduction list number Y included in the reproduction impression coordinate value list is generated.

Figure 13:
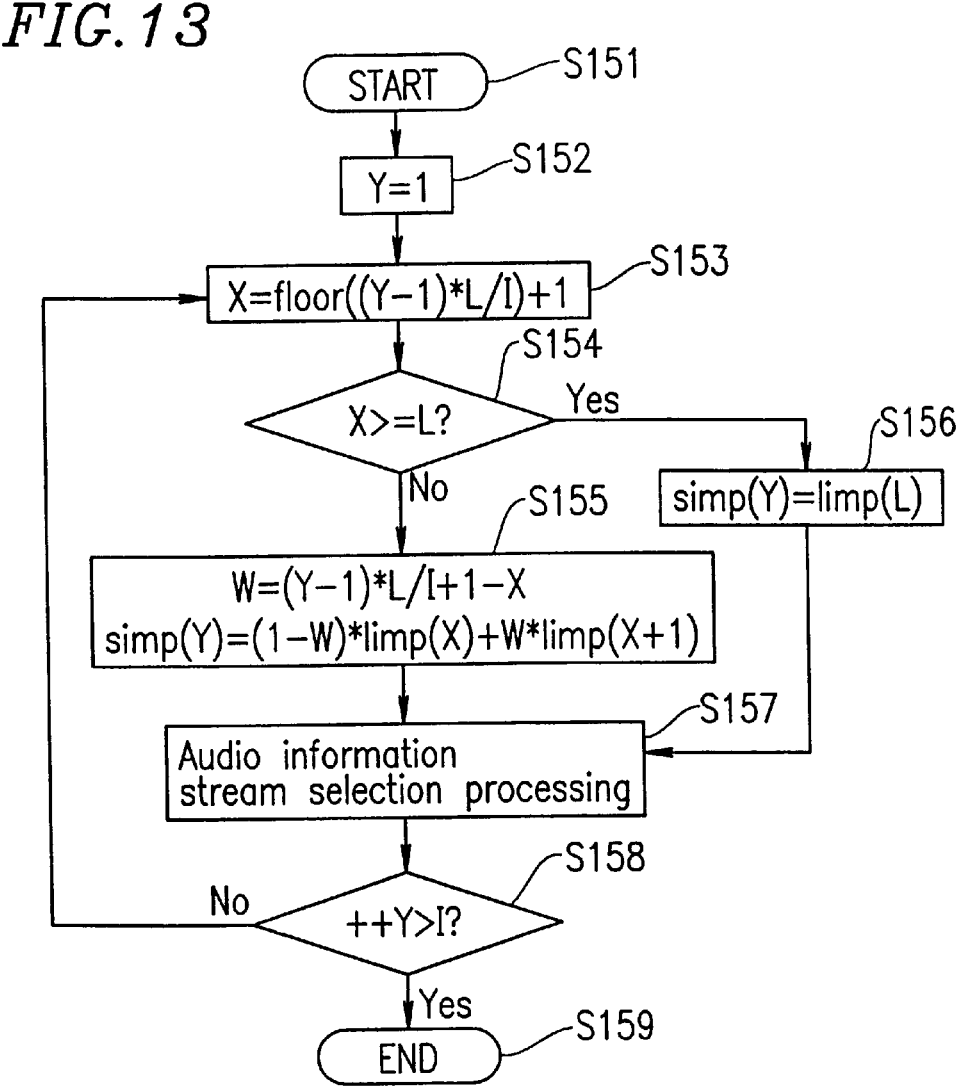
FIG. 13 is a flowchart illustrating play list generation processing performed when the user inputs data to an audio information stream number input section in the audio information provision apparatus shown in FIG. 12.

FIG. 13 is a flowchart illustrating play list generation processing in case (2'). Play list generation processing will be described with reference to FIG. 13.

In step S152, a reproduction list numbers Y is initialized. Next, in step S153, the basic list number X corresponding to the currently selected reproduction list number Y is calculated. The basic list number X is calculated from the expression shown in FIG. 13, step S153. Then, in step S154, it is determined whether the calculated basic list number X has reached the final list number in the basic impression coordinate value list or not. When it is determined that the calculated basic list number X has not reached the final list number in S154, the reproduction impression coordinate value simp (Y) of the currently selected reproduction list number Y is calculated from the X'th and (X+1)'th basic impression coordinate values in the basic impression coordinate value list (step S155). The reproduction impression coordinate value simp(Y) can be an internally dividing point of X'th and (X+1)'th basic impression coordinate values. When it is determined that the calculated basic list number X has reached the final list number in S154, the basic impression coordinate value limp(X) of the calculated basic list number X is used as the reproduction impression coordinate value simp(Y) (step S156).

Next, audio information stream selection processing is performed based on the reproduction impression coordinate value simp(Y) of the reproduction list number Y so as to select an audio information stream from the audio information database 40 (step S157). Then, the value of "1" is added to the value of the reproduction list number Y, and thus the next reproduction number is processed. In step S158, it is determined whether or not all the reproduction list numbers Y have been processed. When it is determined that all the reproduction list numbers Y have not been processed in step S158, processing returns to step S153. When it is determined that all the reproduction list numbers Y have been processed in step S158, generation of the play list is terminated. The play list generated in this manner includes an equal number of audio information streams to the desired number of audio information streams without changing the transfer of impressions represented by the transfer information stream.

(3') When the user inputs data to the time input section 15, play list generation processing is performed as follows. The desired reproduction time period which is specified by the time input section 15 is represented as Td. The processing of case (3') is fundamentally the same as that of case (2'), but processing of case (3') uses an accumulated time period T.

Figure 14:
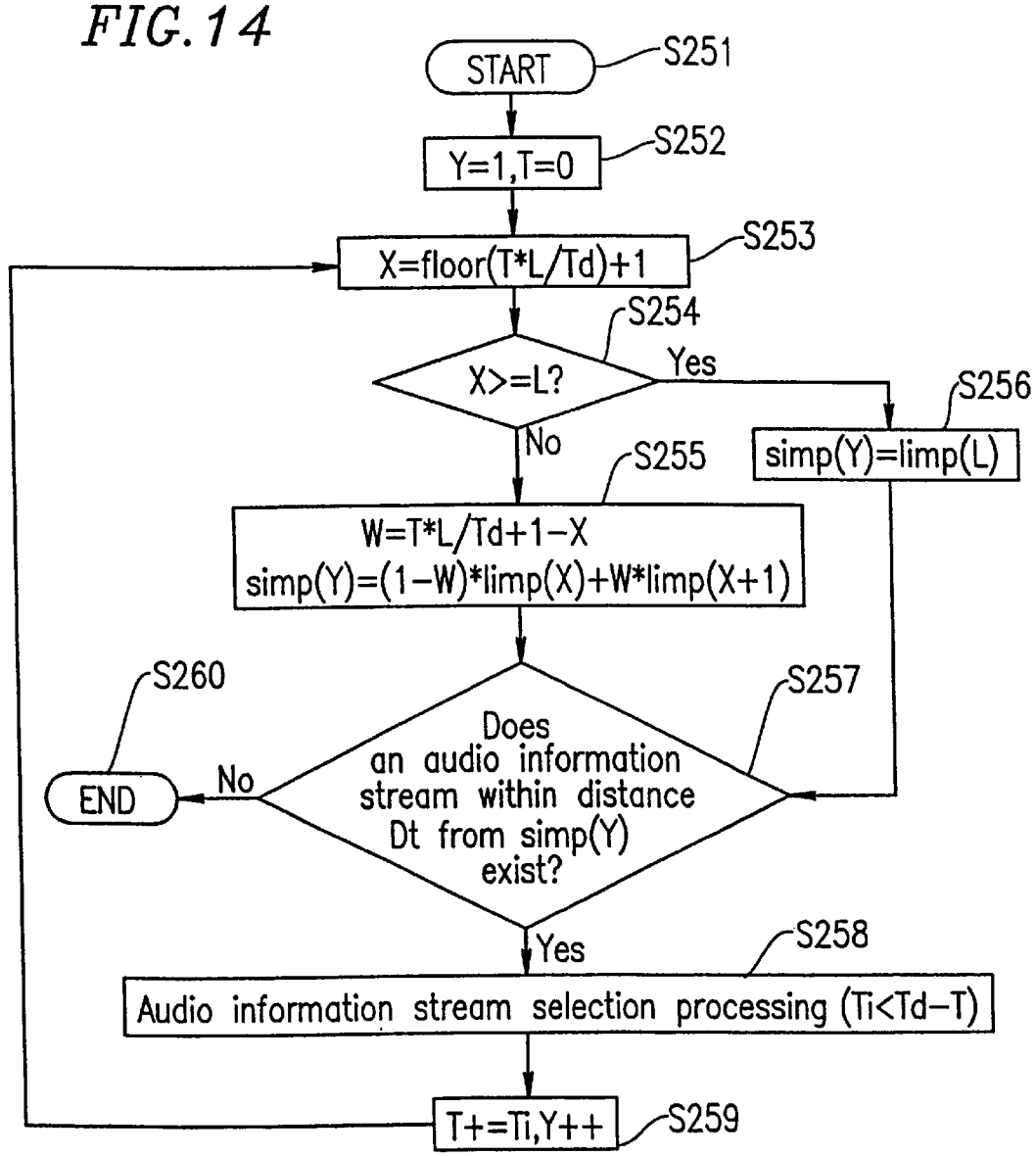
FIG. 14 is a flowchart illustrating play list generation processing performed when the user inputs data to a time input section in the audio information provision apparatus shown in FIG. 12.

FIG. 14 is a flowchart illustrating play list generation processing in case (3'). Play list generation processing will be described with reference to FIG. 14.

In step S252, a reproduction list number Y is initialized. Next, in step S253, the basic list number X corresponding to the current accumulated time period T is calculated. The basic list number X is calculated from the expression shown in FIG. 14, step S253. Then, in step S254, it is determined whether the calculated basic list number X has reached the final list number in the basic impression coordinate value list or not. When it is determined that the calculated basic list number X has not reached the final list number in S254, the reproduction impression coordinate value simp(Y) of the current selected reproduction list number Y is calculated from the X'th and (X+1)'th basic impression coordinate values in the basic impression coordinate value list (step S255). The reproduction impression coordinate value simp (Y) can be an internally dividing point of the X'th and (X+1)'th basic impression coordinate values. When it is determined that the calculated basic list number X has reached the final list number in S254, the basic impression coordinate value limp(X) of the calculated basic list number X is used as the reproduction impression coordinate value simp(Y) (step S256).

Then, in step S257, it is determined whether or not the audio information database 40 includes an audio information stream which corresponds to an impression coordinate value located within a threshold value Dt from the reproduction impression coordinate value simp(Y) and also has a reproduction time period shorter than the remaining reproduction time period Td−T. When it is determined that the audio information database 40 includes such an audio information stream in step S257, audio information stream selection processing is performed based on the reproduction impression coordinate value simp(Y) so as to select an audio information stream from the audio information streams fulfilling the conditions of step S257. The selected audio information stream is added to the play list (step S258). In step S259, the reproduction time period of the selected audio information stream is added to the accumulated time period T. Then, the value of "1" is added to the value of the reproduction list number Y, and thus the next reproduction list number is processed. When it is determined that the audio information database 40 includes no such audio information stream, generation of the play list is terminated (step S260). The play list generated in this manner has a total reproduction time period which is equal to or less than the desired reproduction time period Td without changing the transfer of impressions represented by the transfer information stream.

The play list generation processing described in the first and second examples can be recorded on a recording medium in the form of a program. Any type of computer-readable recording medium, such as a flexible disc, an optical disc or the like is usable. By installing a play list generation processing program which is read from the recording medium in any type of computer capable of inputting and outputting audio information, the computer is allowed to act as an audio information provision device. The play list generation processing may be executed by a play list generation processing device built in or connected to the computer, or at least a part of the play list generation processing may be executed by the computer in the form of software.

Figure 15:
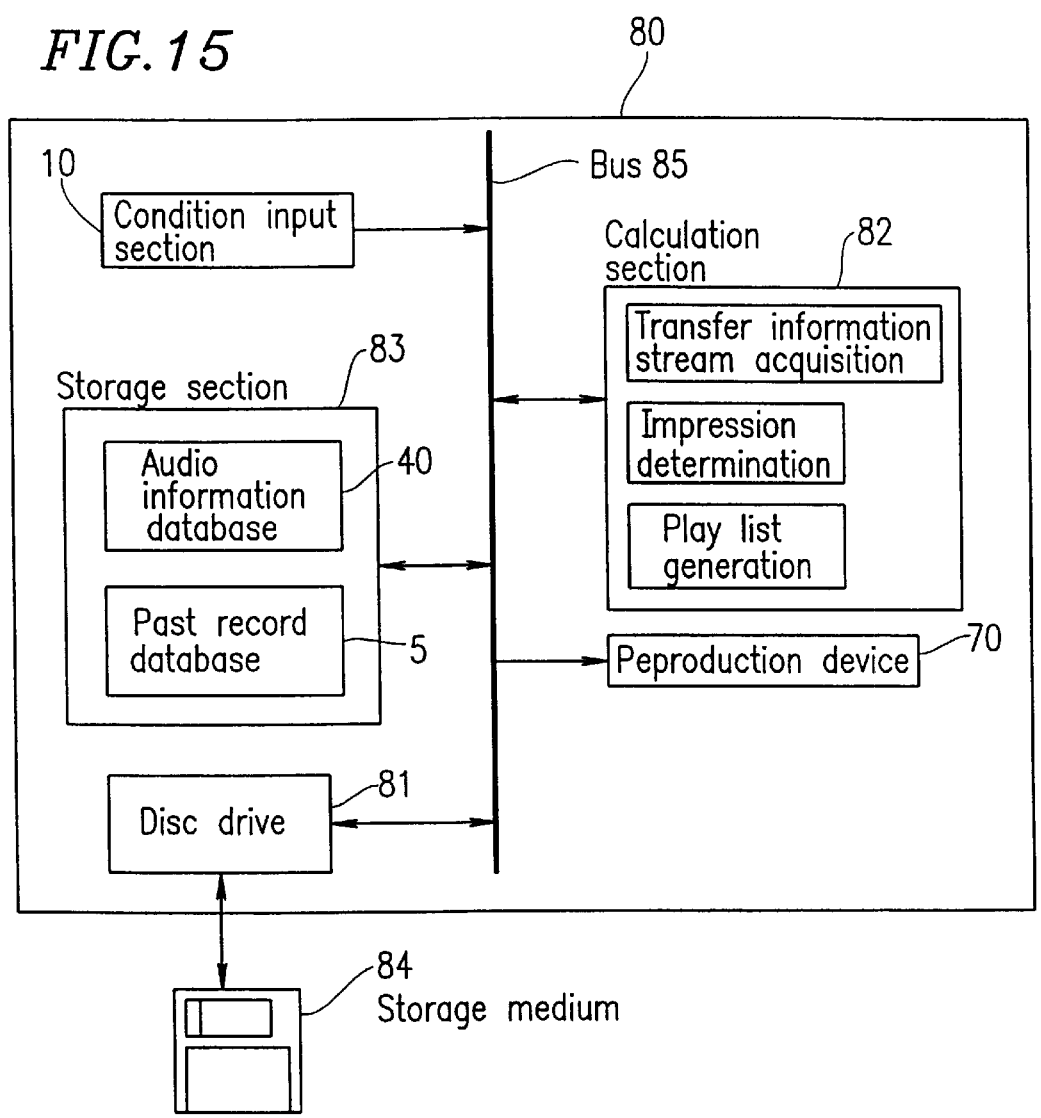
FIG. 15 shows a computer for executing play list generation processing according to the present invention.

FIG. 15 shows an exemplary computer 80 for executing the play list generation processing. The computer 80 includes a disc drive 81 for reading a program for causing the computer 80 to execute the play list generation processing from a storage medium 84 storing the program, a calculation section 82 for executing the play list generation processing, a storage section 83 acting as an audio information database 40 and a past record database 50, a condition input section 10, a reproduction device 70, and a bus 85. The calculation section 82 includes a CPU, a memory and the like (not shown), and processes data similarly to the transfer information stream acquisition section 20, the impression determination section 30, and the play list generation section 60 or 64 shown in FIGS. 1 and 12.

The program may be provided as being stored on a recording medium or delivered via the Internet or the like.

EXAMPLE 3

Figure 16:
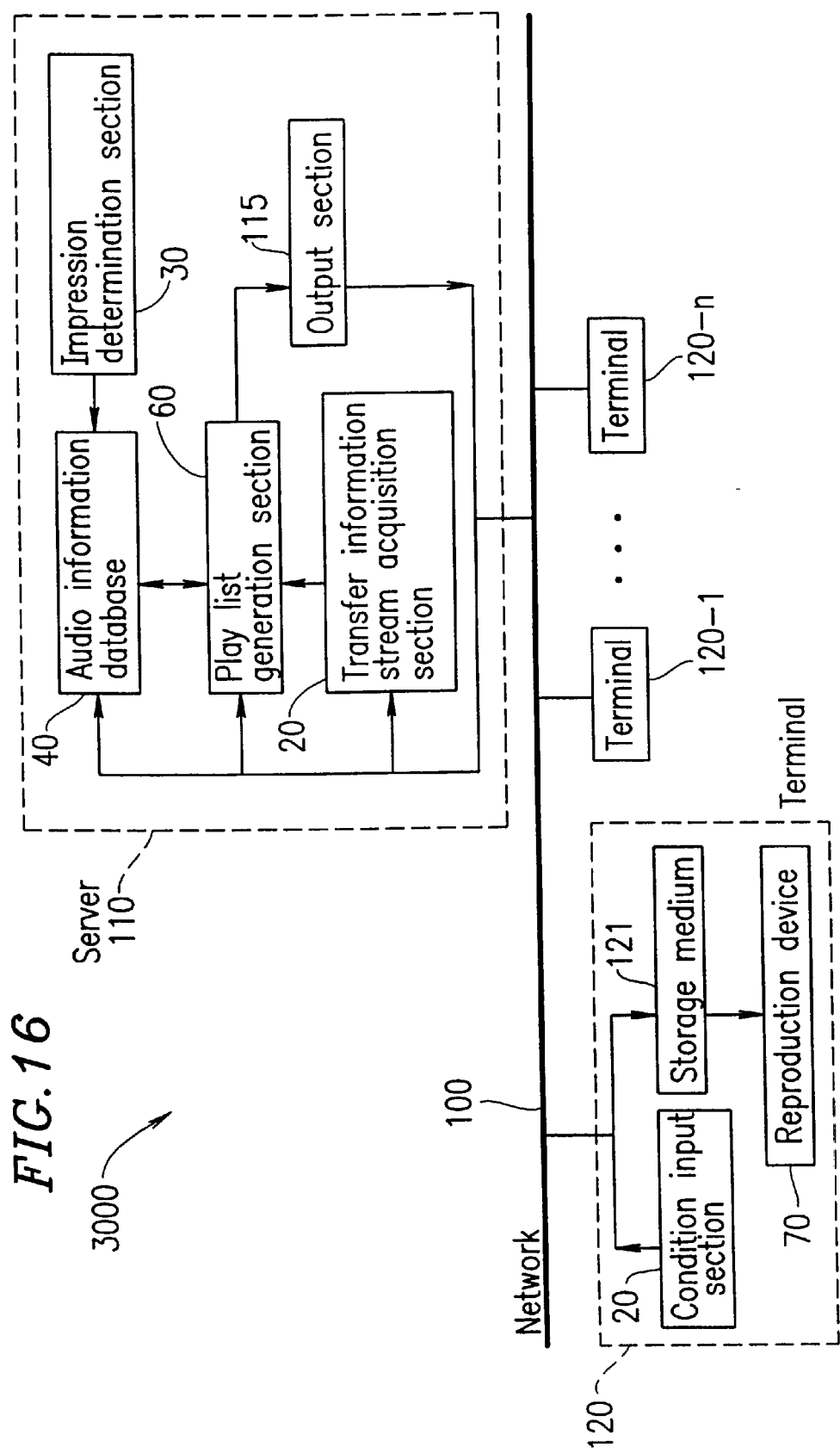
FIG. 16 shows an audio information provision system according to a third example of the present invention.

FIG. 16 shows an audio information provision system 3000 according to a third example of the present invention.

The audio information provision system 3000 includes a network 100, a server 110, and a terminal 120 such as, for example, a personal computer or a music server. When conditions of a target is input to the terminal 120, the server 110 automatically generates a play list suitable to the conditions and delivers the play list to the terminal 120.

The network 100 is connected to the server 110 for delivering audio information and the terminal 120 for receiving the delivered audio information. The network 100 is also connected to a plurality of terminals 120-1 through 120-n (n is a natural number) having functions similar to those of the terminal 120.

The audio information provision system 3000 includes the elements of the audio information provision apparatuses 1000 (first example) and 2000 (second example) which are located on the network 100 in a divided manner. Therefore, even when the user does not have the audio information database 40, the user can download audio information suitable to his/her desired image from the server 110 via the network 100.

The server 110 includes a transfer information stream acquisition section 20, an impression determination section 30, an audio information database 40, a play list generation section 60 (or 64), and an output section 115 for outputting a play list to the terminal 120. The server 110 may include a past record database 50 shown in FIG. 1. The past record database 50 may be eliminated from the audio information provision system 3000 since an audio information stream which has once been delivered usually need not be delivered again in the audio information delivery service. The terminal 120 includes a condition input section 10, a reproduction device 70, and a storage medium 121 or storing the play list delivered from the server 110.

In this example, the audio information provision system 3000 does not include the past record database 50 which is included in the audio information provision apparatuses 1000 and 2000, but includes an output section 115 and a storage medium 121 in addition to the elements of the audio information provision apparatuses 1000 and 2000. An exemplary operation of the audio information provision system 3000 will be described mainly on such differences in the elements from those of the audio information provision apparatuses 1000 and 2000.

Individual ID information which is input to the condition input section 10 can be stored in the audio information database 40. In this case, information related to audio information streams included in a play list which has been delivered to a user includes the user's individual ID information. Therefore, the same audio information streams can be prevented from being delivered to the same user in the future.

When the user inputs a selection system to the condition input 10, the user only inputs the "degree of reflection of demand" but does not input the "importance" or the "degree of reflection of taste" since the past record information of the user is not used. The play list generation section 60 generates an evaluation expression without using the past record information. The satisfaction degree information is not input to the condition input section 10.

At least one of the audio information stream number or the desired reproduction time period is preferably input to the condition input section 10.

Since the audio information provision system 3000 does not include the past record database 40, the evaluation function expression used for calculating the total evaluation value E(x) regarding the audio information stream x is changed from expression (1) mentioned above to expression (12).

$$E(x) = Ei(x) + 0.01 \quad (12)$$

The impression evaluation value Ei(x) is calculated based on expression (2) mentioned above. Expression (12) obtains the total evaluation value E(x) using only the impression evaluation value Ei(x).

The play list generation section 60 substitutes the distance d(x) obtained regarding each audio information stream included in the candidate list in the evaluation function expression so as to calculate the total evaluation value E(x), and performs audio information stream selection processing based on the total evaluation value E(x). The play list generation section 60 retrieves selected audio information stream from the audio information database 40 and thus generates a play list. The generated play list is input to the output section 115.

The output section 115 delivers the play list which is input by the play list generation section 60 to the terminal 120 of the user corresponding to the individual ID information received by the server 110 via the network 100. The terminal 120 stores the received play list in the storage medium 121.

The storage medium 121 is, for example, a hard disc of a personal computer or a music server, and stores the play list delivered from the server 110. The audio information streams included in the play list are input to the reproduction device 70, and the reproduction device 70 reproduces the audio information streams. In this manner, the audio information streams are provided to the target.

The audio information provision system 3000 in this example realizes a service by which, when a user inputs conditions of a specific target to the terminal 120 connected to the network 100, the sever 110 generates and delivers a play list suitable to the conditions.

The present invention generates a play list including a plurality of audio information streams which gives a target a transfer of impressions proximate to the transfer of impressions represented by a transfer information stream. The transfer information stream is acquired based on a condition of the target. Therefore, the generated play list gives the target a transfer of impressions suitable to the target.

According to the present invention, the play list generation device does not select audio information streams suitable to the image desired by the user individually. Instead, the play list generation device acquires an impression coordinate value list including a plurality of impression coordinate values, suitable to the image desired by the user, arranged time-wise, and then selects audio information streams having impression coordinate values proximate to the impression coordinate values registered in the impression coordinate value list. Thus, a play list fulfilling the condition of the target and providing a transfer of impressions can be generated.

According to the present invention, a new audio information stream is stored in the audio information database after an impression coordinate value of the new audio information stream is automatically calculated. Therefore, the user can store a new audio information stream in the audio information database without having specialized music knowledge. By storing the new audio information stream in the audio information database, a play list including the newly store audio information stream can be generated.

According to the present invention, one of a plurality of candidate audio information streams registered in a candidate list can be selected in consideration of the past record information which reflects the user's taste. Therefore, a play list matching the user's taste can be generated. By specifying a selection rule, different audio information streams can be included in the play lists even when the play lists are generated to the same image. In the case where the number of audio information streams to be reproduced and the reproduction time period are specified as well as the image, the user can enjoy play lists including various audio information streams, instead of listening to the same audio information streams. Thus, the user is highly satisfied.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A play list generation device for generating a play list of a first set of audio information streams in an order to be reproduced by a reproduction device, the play list generation device comprising:
    a first database storing a first plurality of audio information streams;
    a condition input section for receiving a condition of a target to which the first set of audio information streams reproduced by the reproduction device are to be provided;
    a transfer information stream acquisition section for acquiring a transfer information stream which represents a transfer of impressions given to the target by reproduction of a second set of audio information streams in a prescribed order based on the condition; and
    a play list generation section for selecting, from the first plurality of audio information streams stored in the first database, a second plurality of audio information streams which give the target a transfer of impressions proximate to the transfer of impressions represented by the transfer information stream, and generating a play list including the selected second plurality of audio information streams as the first set of audio information streams.

2. A play list generation device according to claim 1, wherein:
    the condition input section includes an audio information stream number input section for receiving a number of audio information streams to be included in the play list, and
    the play list generation section selects a number of audio information streams equal to the received number of audio information streams, based on a plurality of impressions representing at least a part of the transfer of impressions.

3. A play list generation device according to claim 1, wherein:
    the condition input section includes a time input section for receiving a reproduction time period of the play list, and
    the play list generation section selects the second plurality of audio information streams so that a total reproduction time period of the play list is equal to or less than the received reproduction period, based on a plurality of impressions representing at least a part of the transfer of impressions.

4. A play list generation device according to claim 1, wherein:
    the condition input section includes an image input section for receiving an image of the play list, and
    the transfer information stream acquisition section stores a plurality of transfer information streams, and selects a transfer information stream corresponding to the image.

5. A play list generation device according to claim 1, wherein:
    the first database stores a plurality of related information streams respectively corresponding to the first plurality of audio information streams stored in the first database,
    the plurality of related information streams each have a coordinate value representing a position of the corresponding audio information stream in a prescribed coordinate system defining impressions of audio information streams,
    the transfer information stream represents a plurality of coordinate values in the prescribed coordinate system, and
    the play list generation section selects an audio information stream to be added to the play list, from at least one audio information stream corresponding to at least one related information stream having a coordinate value within a prescribed range from a reference coordinate value which is obtained based on the plurality of coordinate values, based on a distance between the coordinate value included in the at least one related information stream and the reference coordinate value.

6. A play list generation device according to claim 5, wherein:
    the condition input section includes a selection method input section for receiving a selection method of an audio information stream, and
    the play list generation section includes an evaluation expression generation section for generating an evaluation expression based on the selection system, and selects an audio information stream to be added to the play list from the at least one audio information stream, further based on the generated evaluation expression.

7. A play list generation device according to claim 5, wherein:
    the condition input section includes a satisfaction degree input section for receiving satisfaction degree information which represents a satisfaction degree of the target presented by the selected audio information stream,
    the play list generation device further includes a second database which stores time information representing a time when an audio information stream is provided to the target and the satisfaction degree information, and
    the play list generation section selects an audio information stream to be added to the play list from the at least one audio information stream, further based on at least one of the time information and the satisfaction degree information.

8. A play list generation device according to claim 7, wherein the satisfaction degree information further represents the condition of the target and the time when the satisfaction degree is input.

9. A play list generation device according to claim 1, further comprising an impression determination section for externally receiving an audio information stream and determining an impression of the received audio information stream based on a musical feature of the received audio information stream,
    wherein the first database stores the received audio information stream as well as a reproduction time period of the received audio information stream and the determined impression.

10. An audio information provision apparatus, comprising:
- a play list generation device according to claim 1;
- a reproduction device for reproducing audio information streams selected by the play list generation device.

11. A play list generation method for generating a play list of a first set of audio information streams in an order to be reproduced by a reproduction device, the play list generation method comprising the steps of:
- receiving a condition of a target to which the first set of audio information streams reproduced by the reproduction device are to be provided;
- acquiring a transfer information stream which represents a transfer of impressions given to the target by reproduction of a second set of audio information streams in a prescribed order based on the condition; and
- selecting, from a first plurality of audio information streams stored in a first database, a second plurality of audio information streams which give the target a transfer of impressions proximate to the transfer of impressions represented by the transfer information stream, and generating a play list including the selected second plurality of audio information streams as the first set of audio information streams.

12. A play list generation method according to claim 11, wherein:
- the step of receiving the condition includes the step of receiving a number of audio information streams to be included in the play list, and
- the step of generating the play list includes the step of selecting a number of audio information streams equal to the received number of audio information streams, based on a plurality of impressions representing at least a part of the transfer of impressions.

13. A play list generation method according to claim 11, wherein:
- the step of receiving the condition includes the step of receiving a reproduction time period of the play list, and
- the step of generating the play list includes the step of selecting the second plurality of audio information streams so that a total reproduction time period of the play list is equal to or less than the received reproduction period, based on a plurality of impressions representing at least a part of the transfer of impressions.

14. A play list generation method according to claim 11, wherein:
- the step of receiving the condition includes the step of receiving an image of the play list, and
- the step of acquiring the transfer information stream includes the step of selecting a transfer information stream corresponding to the image.

15. A play list generation method according to claim 11, wherein:
- the first database stores a plurality of related information streams respectively corresponding to the first plurality of audio information streams stored in the first database,
- the plurality of related information streams each have a coordinate value representing a position of the corresponding audio information stream in a prescribed coordinate system defining impressions of audio information streams,
- the transfer information stream represents a plurality of coordinate values in the prescribed coordinate system, and
- the step of generating the play list includes the step of selecting an audio information stream to be added to the play list, from at least one audio information stream corresponding to at least one related information stream having a coordinate value within a prescribed range from a reference coordinate value which is obtained based on the plurality of coordinate values, based on a distance between the coordinate value included in the at least one related information stream and the reference coordinate value.

16. A play list generation method according to claim 15, wherein:
- the step of receiving the condition includes the step of receiving a selection method of an audio information stream,
- the step of generating the play list includes the step of generating an evaluation expression based on the selection system, and
- the step of selecting an audio information stream to be added to the play list selects the audio information stream further based on the generated evaluation expression.

17. A play list generation method according to claim 15, wherein:
- the step of receiving the condition includes the step of receiving satisfaction degree information which represents a satisfaction degree of the target presented by the selected audio information stream,
- the play list generation method further includes the step of storing time information representing a time when an audio information stream is provided to the target and the satisfaction degree information, and
- the step of selecting an audio information stream to be added to the play list selects the audio information stream further based on at least one of the time information and the satisfaction degree information.

18. A play list generation method according to claim 17, wherein the satisfaction degree information further represents the condition of the target and the time when the satisfaction degree is input.

19. A play list generation method according to claim 11, further comprising the steps of:
- externally receiving an audio information stream and determining an impression of the received audio information stream based on a musical feature of the received audio information stream, and
- storing the received audio information stream as well as a reproduction time period of the received audio information stream and the determined impression.

20. A play list generation method according to claim 11, further comprising the step of reproducing the first set of audio information streams.

21. A program for causing a computer to execute generation processing of a play list of a first set of audio information streams in an order to be reproduced by a reproduction device, wherein the generation processing includes the steps of:
- receiving a condition of a target to which the first set of audio information streams reproduced by the reproduction device are to be provided;
- acquiring a transfer information stream which represents a transfer of impressions given to the target by reproduction of a second set of audio information streams in a prescribed order based on the condition; and
- selecting, from a first plurality of audio information streams stored in a database, a second plurality of audio information streams which give the target a transfer of impressions proximate to the transfer of impressions represented by the transfer information stream, and generating a play list including the selected second plurality of audio information streams as the first set of audio information streams.

22. A computer-readable recording medium storing a program for causing a computer to execute generation processing of a play list of a first set of audio information streams in an order to be reproduced by a reproduction device, wherein the generation processing includes the steps of:

receiving a condition of a target to which the first set of audio information streams reproduced by the reproduction device are to be provided;

acquiring a transfer information stream which represents a transfer of impressions given to the target by reproduction of a second set of audio information streams in a prescribed order based on the condition; and selecting, from a first plurality of audio information streams stored in a database, a second plurality of audio information streams which give the target a transfer of impressions proximate to the transfer of impressions represented by the transfer information stream, and generating a play list including the selected second plurality of audio information streams as the first set of audio information streams.

23. An audio information provision system, comprising:

a server for generating a play list of a first set of audio information streams in an order to be reproduced by a reproduction device; and a terminal connected to the server via a network, wherein:

the terminal includes a condition input section for receiving a condition of a target to which the first set of audio information streams reproduced by the reproduction device are to be provided, the server includes:

a database storing a plurality of audio information streams, a transfer information stream acquisition section for acquiring a transfer information stream which represents a transfer of impressions given to the target by reproduction of a second set of audio information streams in a prescribed order based on the condition, a play list generation section for generating a play list for selecting, from the first plurality of audio information streams stored in the database, a second plurality of audio information streams which give the target a transfer of impressions proximate to the transfer of impressions represented by the transfer information stream, and generating a play list including the selected second plurality of audio information streams as the first set of audio information streams, and an output section for outputting the generated play list, and the terminal includes:

a storage section for storing the play list received from the server, and the reproduction device for reproducing the first set of audio information streams.

* * * * *

UNITED STATES PATENT AND TRADEMARK OFFICE
CERTIFICATE OF CORRECTION

PATENT NO.   : 6,605,770 B2
DATED        : August 12, 2003
INVENTOR(S)  : Hiroaki Yamane et al.

It is certified that error appears in the above-identified patent and that said Letters Patent is hereby corrected as shown below:

<u>Title page,</u>
Item [57], ABSTRACT,
Line 3, "are production" should read -- a reproduction --.

Signed and Sealed this

Eleventh Day of November, 2003

JAMES E. ROGAN
*Director of the United States Patent and Trademark Office*